(12) United States Patent
Arai et al.

(10) Patent No.: US 6,597,368 B1
(45) Date of Patent: Jul. 22, 2003

(54) MORPHING IMAGE PROCESSING SYSTEM USING POLYGON REDUCTION PROCESSING

(75) Inventors: Masatoshi Arai, Kawasaki (JP); Yoshinori Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 483 days.

(21) Appl. No.: 09/626,108

(22) Filed: Jul. 26, 2000

(30) Foreign Application Priority Data

Sep. 6, 1999 (JP) .......................................... 11-251458

(51) Int. Cl.[7] .................................................. G09G 5/00
(52) U.S. Cl. ...................................... 345/646; 345/420
(58) Field of Search ................................ 345/418, 419, 345/467, 606, 607, 610, 619, 629, 646, 672, 698, 726, 420; 382/236, 300; 707/104.1; 358/1.15, 1.16; 710/31

(56) References Cited

U.S. PATENT DOCUMENTS

| | | | |
|---|---|---|---|
| 6,295,538 B1 | * | 9/2001 | Cooper et al. ........... 707/104.1 |
| 6,362,833 B2 | * | 3/2002 | Trika ......................... 345/646 |
| 6,438,275 B1 | * | 8/2002 | Martins et al. ............. 382/300 |
| 6,504,552 B2 | * | 1/2003 | Phillips ..................... 345/726 |

FOREIGN PATENT DOCUMENTS

JP          9-73559          3/1997

* cited by examiner

*Primary Examiner*—Mark Zimmerman
*Assistant Examiner*—Lance W. Sealey
(74) *Attorney, Agent, or Firm*—Staas & Halsey LLP

(57) ABSTRACT

A first image before deformation and a second image after deformation are input and formed into polygon models represented with a polygon mesh by a polygon model generation processing part. Polygon reduction processing is performed by a low progression level polygon model generation processing part to generate low progression level polygon models having a reduced number of polygons and metadata containing the reduction process of the number of polygons. A low progression level polygon model morphing processing part specifies corresponding vertices between the low progression level polygon models, and then they are formed into intermediate low progression level polygon models by interpolation. Intermediate images are generated by reproducing processing to the polygon model using the metadata by an intermediate image generation processing part and texture mapping.

19 Claims, 20 Drawing Sheets

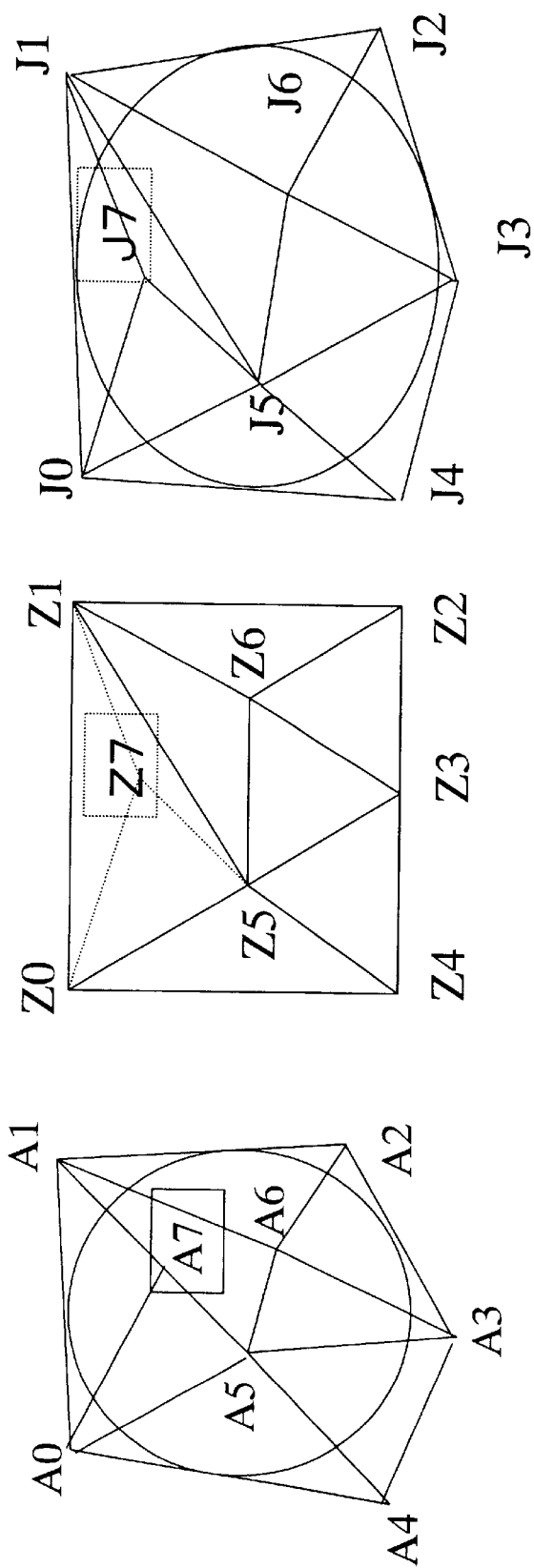

MORPHING IMAGE PROCESSING SYSTEM USING POLYGON REDUCTION PROCESSING

BACKGROUND OF THE INVENTION

1. Field of the Invention

The present invention relates to a morphing image processing system and a morphing processing method for performing morphing processing where intermediate images interpolated between a first image and a second image are formed so that the first image is deformed smoothly into the second image. In particular, the present invention relates to a morphing processing image processing system and method that represents an image with a polygon mesh and uses processing for reducing the number of polygons (polygon reduction).

2. Description of the Related Art

With high performance of the recent computer systems and development of multimedia processing techniques, an environment is emerging where a high level of three dimensional (hereinafter, abbreviated as 3D) computer graphics (hereinafter, abbreviated as CG) can be processed on personal computers or the like. Moreover, accelerator boards dedicated to processing of three dimensional CG is being provided. The image processing technique has been developed so that various special effects can be provided or synthesis processing can be performed to an image to edit the image.

In the current image processing, one of the noted techniques is morphing processing. Morphing processing is a technique of slowly and smoothly deforming a first image, which is the original image, into a second image, which is the target image. For example, this technique is used for video image special effects in movies, such as an effect used in a scene where a human is deformed gradually into a wolf.

In this morphing processing technique, multiple intermediate images interpolated between the first image and the second image are formed based on these images, and the intermediate images are displayed in the order of progression of the change so that the image can be deformed smoothly into the second image. The morphing processing is generally classified into two-dimensional morphing (hereinafter, referred to as 2D morphing), and three-dimensional morphing (hereinafter, referred to as 3D morphing). FIGS. 20A to 20C show the concept of 2D morphing processing.

First, data of a 2D image before deformation, which is the first image, and data of a 2D image after deformation, which is the second image are prepared. Next, points characterizing these images (hereinafter, referred to as control points) are selected from these 2D image data. In FIGS. 20A to 20C, an example of the control point of the first image is represented by AX, and an example of the control point of the second image is represented by ZX. In this example, the points having the same argument X correspond to each other. Next, the difference between the control point of the first image and the corresponding control point of the second image is calculated to obtain an intermediate value based on the difference, and further intermediate values are obtained to make the difference progressively smaller and smaller by a predetermined number of steps. Herein, obtaining the intermediate values in this manner is referred to as interpolation. Next, the intermediate values of the control points are collected at each step, and an image defined by these control points is restored. Then, an intermediate image represented by these control points can be obtained at each step. Then, the obtained intermediate images are displayed in the order of deformation in time series, so that a special effect of the first image being deformed gradually into the second image can be obtained.

In the above-described morphing processing, in order to achieve more smooth deformation of the image, a large number of control points are selected densely over the entire image, or the number of deformation steps is made large.

The 3D morphing is performed substantially in the same manner as in the 2D morphing. However, the 3D morphing is more complicated than the 2D morphing, because the control points are three-dimensionally selected.

The above-described morphing processing in the related art has the following problems.

A first problem is as follows. Since it is necessary to select a large number of control points densely to obtain a smoothly deforming image, and to perform processing at a large number of deformation steps, interpolation calculation of the control points is performed in a great amount, resulting in complicated processing and increased time-cost. The interpolation calculation amount can be reduced simply by reducing the number of the control points to be selected. In this case, however, the image is distorted during deformation, resulting in poor image quality. Furthermore, the interpolation calculation amount can be reduced simply by reducing the number of deformation steps. However, the image is not smoothly deformed and a natural video image cannot be obtained.

A second problem is that specifying corresponding control points between the first image and the second image is difficult, when the difference in the number of the control point between the first image before deformation and the second image after deformation is large. If the control points in the first image correspond to those in the second image on the one-to-one basis, interpolation calculation is performed easily. However, when the control points do not correspond on the one-to-one basis, it is necessary to perform control point synthesis processing or control point degeneration processing separately in parallel to the interpolation calculation of the control points. Therefore, the interpolation calculation amount of the control points becomes large, the processing becomes complicated, and time-cost is increased.

A third problem is that it is generally difficult to select the control points and to specify the corresponding control points between the first image before deformation and the second image after deformation. In particular, 3D morphing is more difficult than 2D morphing, because selecting the control points and specifying the corresponding control points are performed three-dimensionally, so that the processing is complicated.

SUMMARY OF THE INVENTION

Therefore, in view of the foregoing problems in the conventional morphing process, it is an object of the present invention to provide a morphing image processing system and method that can retain a large number of control points of the image and a large number of deformation steps, can maintain the image quality, can reduce the interpolation calculation amount while realizing smooth image deformation, and can reduce the load of the processing.

It is another object of the present invention to provide a morphing image processing system and method that can reduce the interpolation calculation amount while realizing smooth image deformation, and can reduce the load of the processing, even if some control points cannot find their corresponding control points in the morphing step between the first image and the second image.

It is another object of the present invention to provide a morphing image processing system and method that can automatically select the control points in the first image before deformation and the second image after a deformation and specify the corresponding control points.

In order to achieve the above objects, a morphing image processing system of the present invention for performing morphing processing for deforming a first image smoothly into a second image while forming intermediate images interpolated between the first image and the second image includes a low progression level polygon model generation processing part for performing polygon reduction processing to a first polygon model corresponding to the first image and a second polygon model corresponding to the second image to generate a first low progression level polygon model and a second low progression level polygon model having a reduced number of polygon vertices, wherein the polygon reduction processing is for obtaining polygon vertex data on each progression level and metadata, and a polygon vertex reduction process is recorded in the metadata; a low progression level polygon model morphing processing part for specifying corresponding vertices between the first low progression level polygon model and the second low progression level polygon model and forming intermediate low progression level polygon models interpolated between the first low progression level polygon model and the second low progression level polygon model; and a morphing intermediate image generation processing part for performing reproducing processing to generate intermediate images between the first and second images by using the metadata, based on the respective intermediate low progression level polygon models, wherein the reproducing processing follows procedures in the opposite order of the polygon vertex reduction process.

With the above embodiment, an image can be represented with a polygon model, and the number of polygons can be reduced by using the polygon reduction processing, so that the interpolation calculation amount can be reduced by performing interpolation between a reduced number of vertices of polygons. Furthermore, polygon models in the original progression level can be generated from the low progression level polygon models to generate intermediate images. Therefore, these intermediate images make it possible to achieve image quality of high precision and smooth deformation.

In other words, a polygon mesh before and after deformation is subdivided to have a large number of polygons, and polygon reduction processing is performed to automatically generate a polygon mesh having an arbitrary number of polygons (a reduced number). Then, interpolation calculation can be performed using the vertices of the polygons of the obtained rougher mesh. Using this polygon reduction processing reduces the number of polygon vertices while retaining the features of the outline, so that distortion of the image can be reduced.

It is preferable that the morphing image processing system includes an intermediate metadata morphing processing part for generating intermediate metadata interpolated between first metadata corresponding to the first low progression level polygon model generated in the low progression level polygon model generation processing and second metadata corresponding to the second low progression level polygon model generated in the low progression level polygon model generation processing, the intermediate metadata corresponding to respective intermediate low progression level polygon models, and that as the metadata used in the reproducing processing of the morphing intermediate image generation processing, corresponding metadata are used for respective intermediate low progression level polygon models.

With the above embodiment, intermediate metadata corresponding to respective intermediate low progression level polygon models can be generated also for metadata necessary to restore the polygon models of a higher progression level from the low progression level polygon models. Therefore, intermediate images with high precision can be generated from the intermediate low progression level polygon models.

Furthermore, in the morphing image processing system, it is preferable that a polygon model represented with a polygon mesh covered with triangle polygons is generated in the polygon model generation processing, and the triangle polygons are obtained by applying a grid with crossed lines extending in each axis direction at predetermined intervals over an image and dividing each region defined by the lines by a predetermined area into triangles having an equal area.

With the above embodiment, it is not necessary to set control points for morphing for a captured image, and a polygon model representing the captured image with a polygon mesh can be generated. Thus, morphing processing can be executed with this polygon model.

The morphing image processing system of the present invention can perform morphing image processing in which the interpolation calculation amount can be reduced by using polygon reduction processing to input images, and that allows high precision images and smooth deformation.

Furthermore, according to the morphing image processing system of the present invention, intermediate images can be generated using the intermediate metadata generated by intermediate metadata morphing that interpolates between the first metadata and the second metadata, so that intermediate images with a higher precision can be obtained. Moreover, the morphing image processing system of the present invention can generate intermediate images by utilizing the difference value of the intermediate metadata, so that the data amount of the intermediate metadata can be reduced.

Furthermore, the morphing image processing system of the present invention can specify corresponding vertices, even if there is a difference in number of the control points between the base image and the target image, by adjusting the difference in number of the vertices therebetween by interpolation.

Furthermore, the morphing image processing system of the present invention can execute morphing processing in accordance with the degree of detail of morphing for each region by designating a partial region of an important image such as the eyes.

These and other advantages of the present invention will become apparent to those skilled in the art upon reading and understanding the following detailed description with reference to the accompanying figures.

BRIEF DESCRIPTION OF THE DRAWINGS

FIGS. 14A and 14C are diagrams showing the concept of corresponding polygon vertex specifying processing by a polygon vertex correspondence adjusting part 44 of Embodiment 4 of the present invention.

DESCRIPTION OF THE PREFERRED EMBODIMENTS

Hereinafter, embodiments of a morphing image processing system and method using polygon reduction processing of the present invention will be described with reference to the accompanying drawings.

First, polygon reduction processing used in the morphing image processing system of the present invention will be described.

In polygon reduction processing, progressive polygon data having a hierarchy corresponding to the levels of the resolution and the degree of details of an object to be displayed is used. Using the progressive polygon data, the number of polygons is increased or decreased by changing the progression level dynamically in accordance with the display conditions, so that the vertices of a polygon mesh are adjusted. The progressive polygon data consists of basic polygon data and detailed polygon data. The basic polygon data are the roughest polygon data, which is the basis, and the detailed polygon data are data described relatively with respect to the basic polygon data.

The basic polygon data are the roughest polygon data (for example, 200 polygons) generated by the polygon reduction processing described below from original polygon data (for example, 10,000 polygons) of a three-dimensional model, and they have information expressed by absolute coordinates. On the other hand, the detailed polygon data are polygon data on each progression level generated by interpolation from the original polygon data vertices to the basic polygon vertices, and they have information expressed by relative coordinates from the progression level and the basic polygon data.

Figure 19:
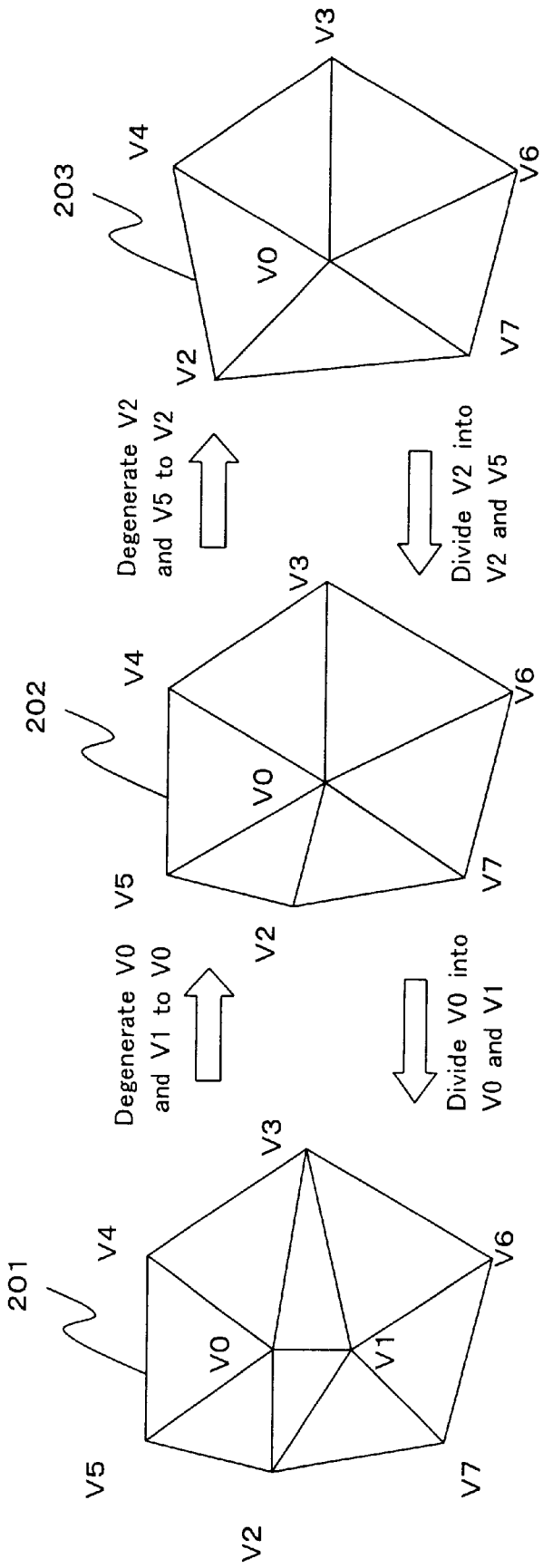
FIG. 19 is a diagram showing the features of progressive polygons utilized in the morphing image processing system of the present invention.
Figure 20C:
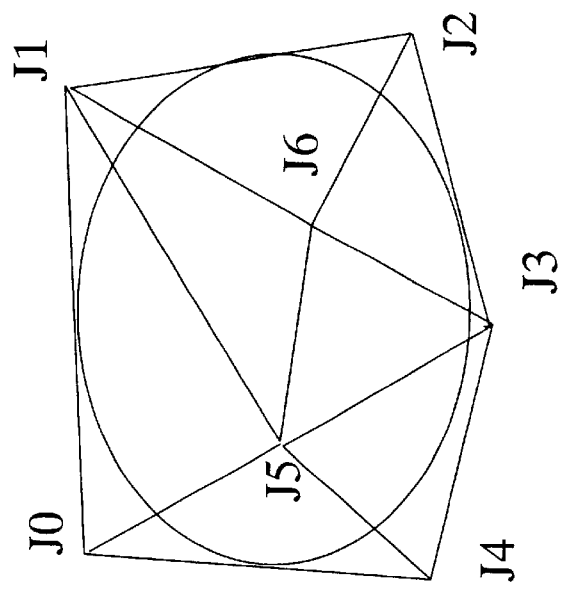
FIGS. 20A to 20C are diagram showing the concept of conventional 2D morphing processing.
Figure 20B:
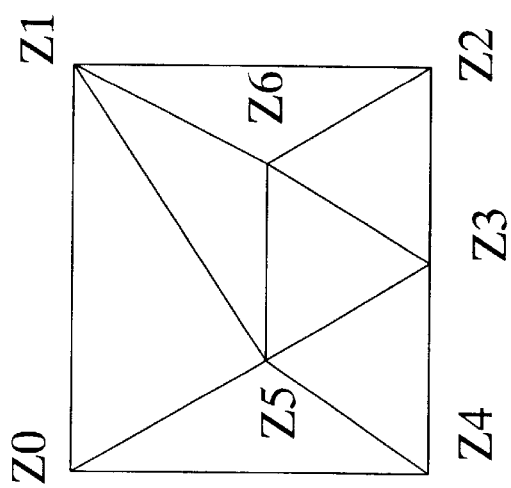
Figure 20A:
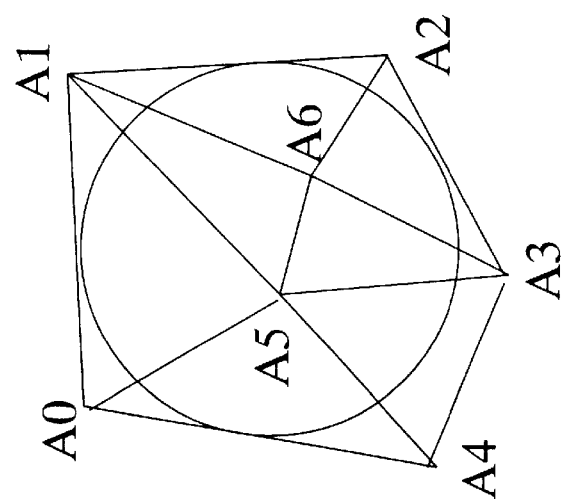

The characteristics of the progressive polygons will be described with reference to FIG. 19. Reference numeral 201 is a polygon mesh formed with progressive polygons in a certain progression level. Reference numeral 202 is a polygon mesh formed with progressive polygons in a progression level that is rougher by one level than the level of the polygon mesh 201. Reference numeral 203 is a polygon mesh formed with progressive polygons in a progression level that is rougher by one level than the level of the polygon mesh 202.

The polygon mesh 201 has 8 polygon vertices V0 to V7. In order to reduce the data amount, some of the polygon vertices may be eliminated and removed (hereinafter, referred to as "degeneration"). For example, the rule of the degeneration is to degenerate one of two polygon vertices whose distance therebetween is within the reference distance L, and the reference distance L of a certain progression level is $L_1$ and the reference distance L of a next detail progression level is $L_2$. In the polygon mesh 201, the distance $L_{V0V1}$ between $V_0$ and $V_1$ satisfies $L_{V0V1}<L_1<L_2$, and the distance $L_{V2V5}$ between $V_2$ and $V_5$ satisfies $L_1<L_{V2V5}<L_2$, as shown in FIG. 19.

First, the transition from the progressive polygon data of the polygon mesh 201 to a rougher progression level by one level will be described. Since the reference distance L of the current progression level is $L_1$, one of the polygon vertices V0 and V1 whose distance therebetween is less than $L_1$ should be degenerated. The polygon mesh 202 is obtained by integrating the polygon vertices V0 and V1 into one polygon vertex so that the vertex V1 is degenerated and the newly formed polygon vertex is denoted as the vertex V0. The number of polygon vertices is 7. In the same manner, in formation of the next progression level, since the reference distance L is $L_2$, one of the polygon vertices V2 and V5 should be degenerated. The polygon vertex V5 is degenerated so that the number of polygon vertices of the polygon mesh 203 becomes 6. The hierarchical process as described above is applied to the entire object so as to obtain polygon data on each progression level, and the polygon data is stored as relative information between the levels. This storage allows the polygon data on each progression level to be interpolated or degenerated dynamically even if the progression level is changed.

Embodiments of a morphing image processing system using polygon reduction processing described above will be described below.

Embodiment 1

A morphing image processing system of Embodiment 1 represents a first image of an input base image and a second image of a target image with polygon models, and reduces the number of polygon vertices of the respective polygon models to form low progression level polygon models, executes low progression level polygon model morphing that performs interpolation between the low progression level polygon models, and generates an intermediate image from each of the intermediate low progression level polygon models.

Figure 1:
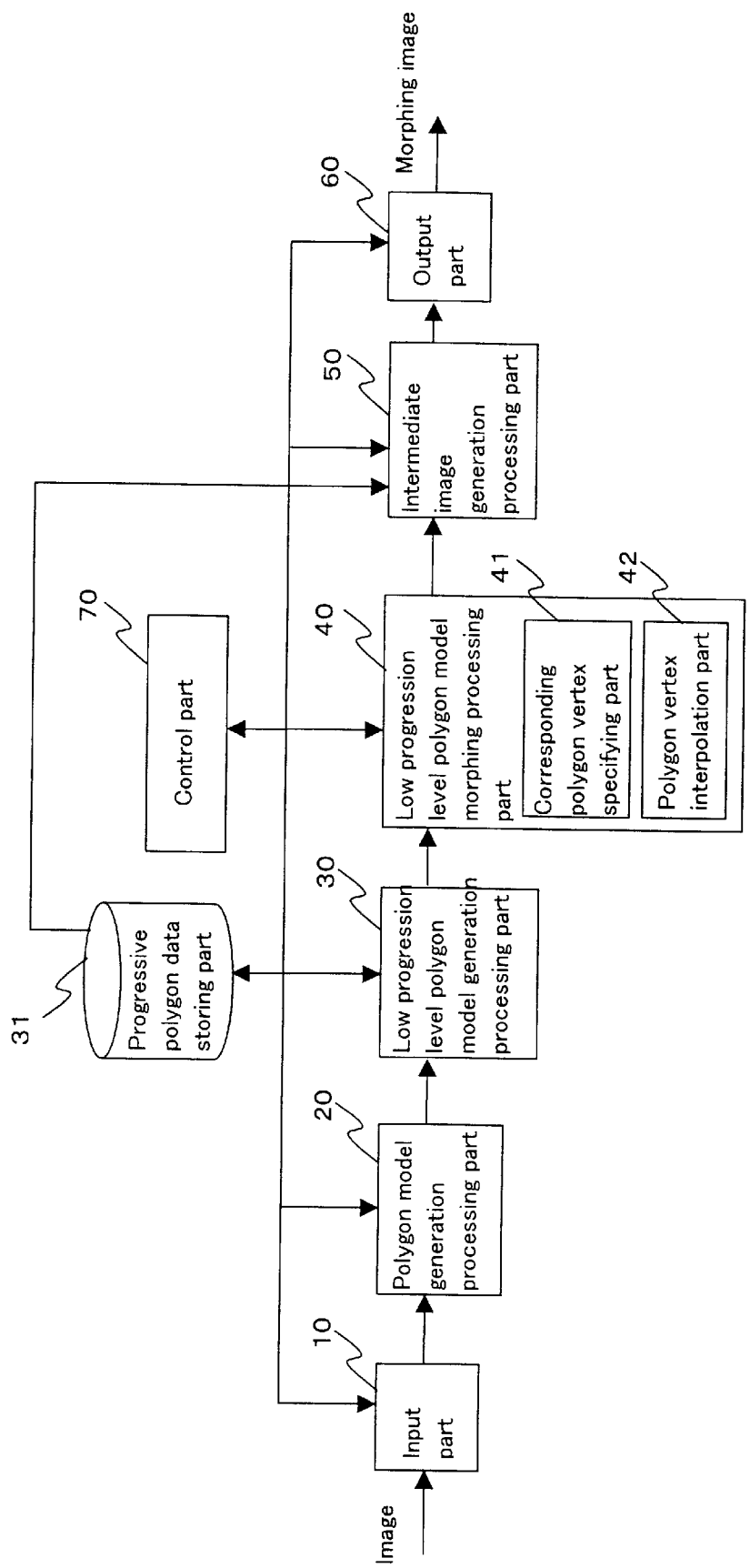
FIG. 1 is a diagram of a schematic configuration of a morphing image processing system of Embodiment 1 of the present invention.
Figure 2:
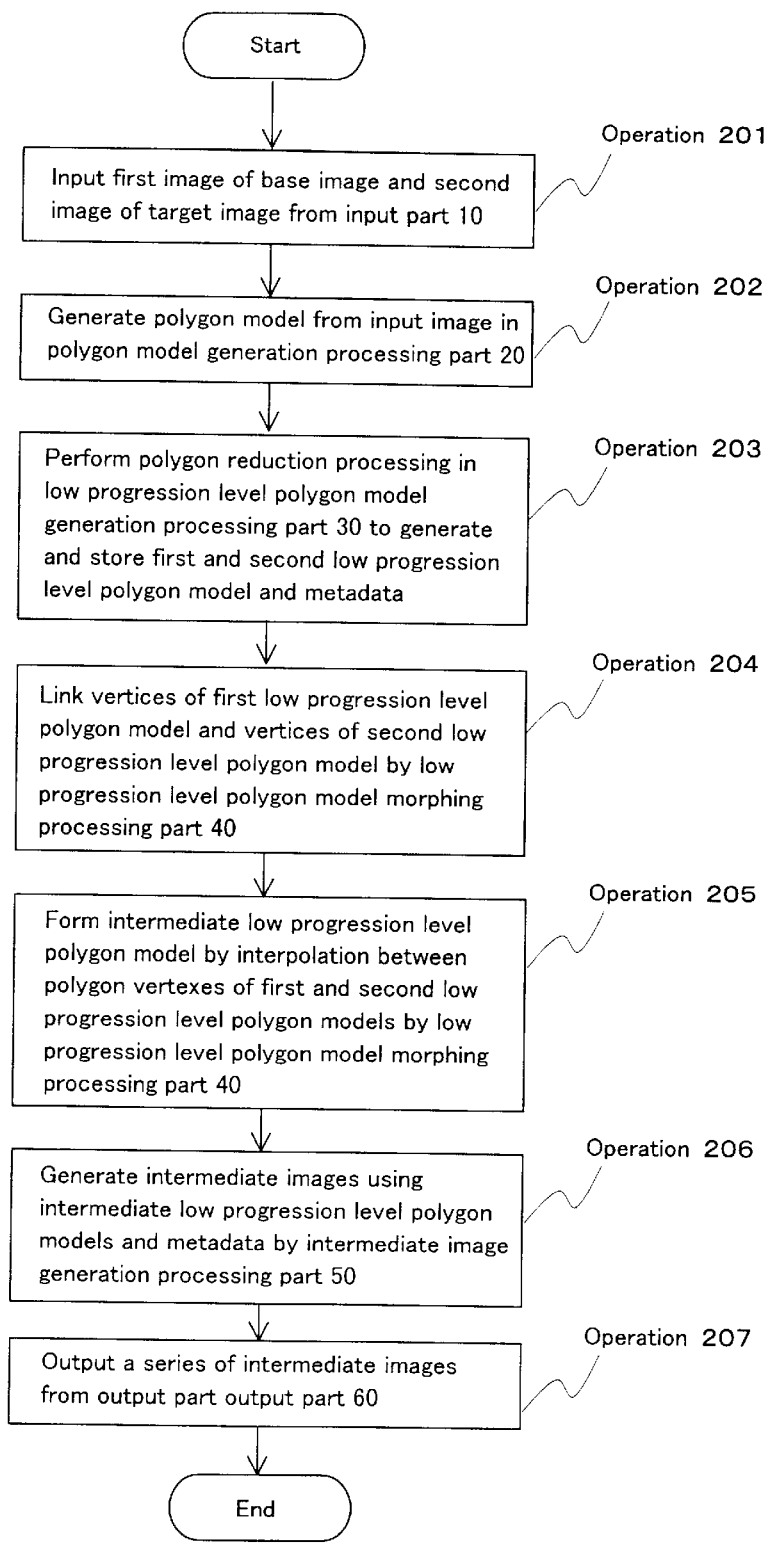
FIG. 2 is a flowchart of the outline of processing flow of the morphing image processing system of Embodiment 1 of the present invention.

The outline of the entire configuration of the morphing image processing system of Embodiment 1 and the outline of the processing flow of this unit will be described with reference to the accompanying drawings. FIG. 1 shows a schematic configuration of the unit of this embodiment. FIG. 2 shows the outline of the processing flow of the unit of Embodiment 1 as processing operations.

As shown in FIG. 1, the morphing image processing system of Embodiment 1 generally includes an input part 10, a polygon model generation processing part 20, a low progression level polygon model generation processing part 30, a progressive polygon data storing part 31, a low progression level polygon model morphing processing part 40, an intermediate image generation processing part 50, an output part 60, and a control part 70. Although not shown, the morphing image processing system includes controllers, memories and devices necessary for control processing of the entire system.

The input part 10 is a part to which an image is input. The first image of the base image before deformation of morphing processing and the second image of the target image after deformation are input.

The polygon model generation processing part 20 generates a polygon model represented by a polygon mesh from the image input via the input part 10. This part generates a first polygon model from the input first image, and generates a second polygon model from the second image. Processing for representing the input image with a polygon mesh by the polygon model generation processing part 20 will be described in detail later.

The low progression level polygon model generation processing part 30 generates low progression level polygon models by performing polygon reduction processing to the polygon models generated by the polygon model generation processing part 20. A first low progression level polygon model is generated by performing polygon reduction processing to the first polygon model, and a second low progression level polygon model is generated by performing polygon reduction processing to the second polygon model. Here, the number of the polygon vertices of the polygon model is reduced in accordance with the polygon progression level by polygon reduction processing. In the polygon reduction processing, the polygon vertex data on each progression level and metadata are obtained. In the metadata, a processing process for reducing the number of the polygon vertices (hereinafter, referred to as polygon vertex reduction process) is recorded. The low progression level polygon model generation processing part 30 stores the polygon vertex data on each progression level and metadata generated in the progressive polygon data storing part 31, which metadata contain the polygon vertex reduction process.

The low progression level polygon model morphing processing part 40 includes a corresponding polygon vertex specifying part 41 and a polygon vertex interpolation part 42. This part forms intermediate polygon models by performing interpolation between corresponding vertices of the two low progression level polygon models, and forms intermediate low progression level polygon models interpolated between the vertices of the first low progression level polygon model and the vertices of the second low progression level polygon model generated by the low progression level polygon model generation processing part 30. By interpolating the intermediate low progression level polygon models in this manner, a sequence of a series of low progression level polygon models in which the first low progression level polygon model is deformed smoothly into the second low progression level polygon model can be obtained.

The intermediate image generation processing part 50 generates intermediate images from the intermediate low progression level polygon model by reproducing processing. This processing follows procedures in the opposite order of the polygon vertex reduction process, using the metadata generated by the low progression level polygon model generation processing part 30, based on each of the intermediate low progression level polygon models generated by the low progression level polygon model morphing processing part 40. Thus, the progression level is raised to the level equal to that of the first and second images. Thus, intermediate images interpolated between the first and second images are generated.

The output part 60 outputs generated image data. A series of intermediate images from the first image of the base image to the second image of the target image are output.

The control part 70 controls processing of each of the above element.

Figure 3:
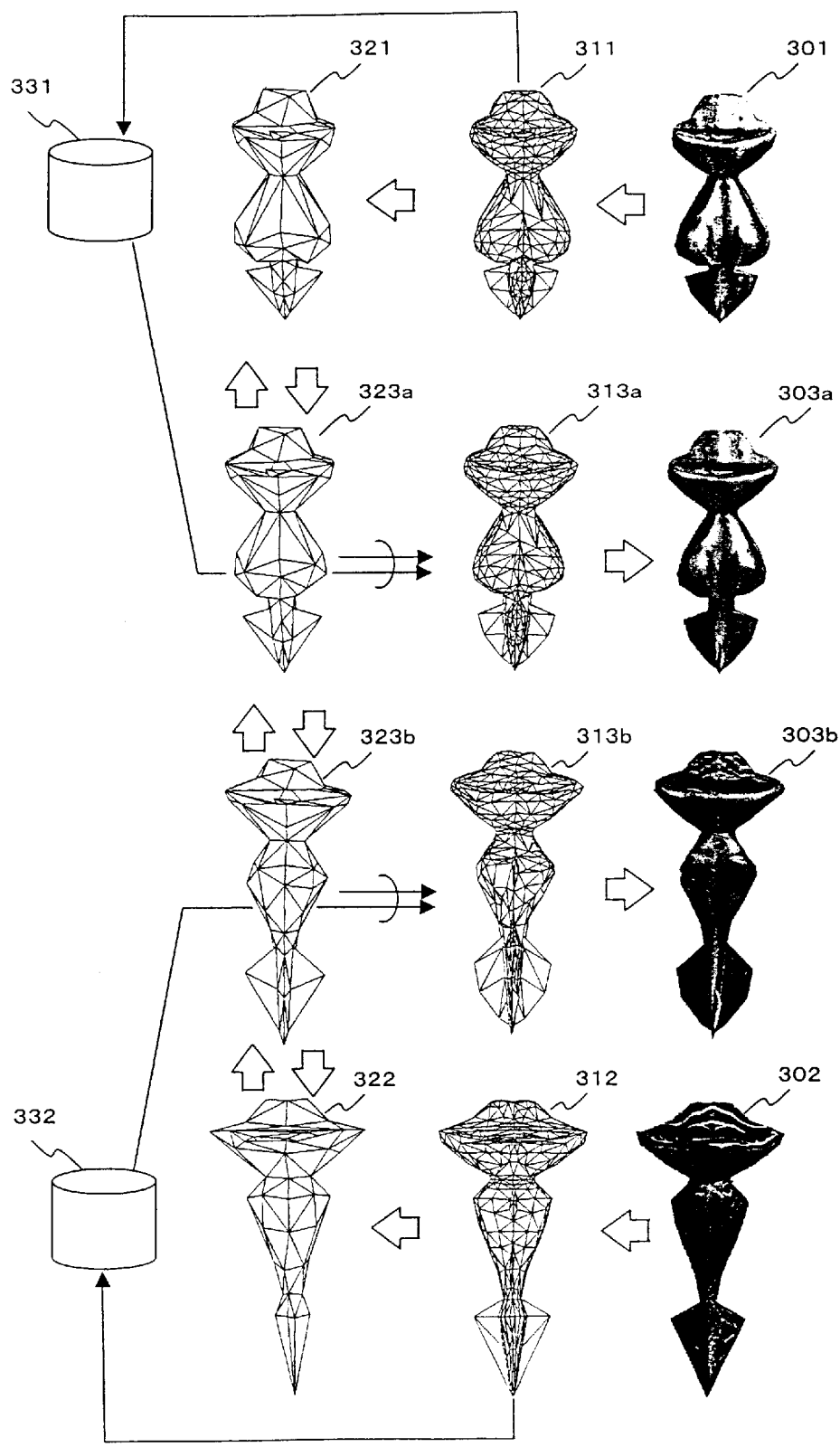
FIG. 3 is a diagram showing the manner in which morphing images are being generated by the morphing image processing system of Embodiment 1 of the present invention.

The outline of the processing flow of the morphing image processing system of the present invention is as follows, as shown in the flowchart of FIG. 2. FIG. 3 is a diagram showing the manner in which morphing images are being generated by the morphing image processing system of the present invention.

First, the first image of a base image before deformation of morphing processing and the second image of the target image after deformation are input from the input part 10 (Operation 201). At this point, a period of time required for image deformation by morphing, the number of steps of deformation, or image quality can be designated. A period of time required for image deformation by morphing or the number of steps of deformation are used as parameters for determining the number of frames of intermediate images prepared from the base image to the target image. The image quality is used as a parameter for determining the number of control points in the image. In FIG. 3, the first image of the base image before deformation is denoted by 301, and the second image of the target image after deformation is denoted by 302.

Next, the a polygon model generation processing part 20 generates a polygon model represented by a polygon mesh from the image input via the input part 10 (Operation 202). In FIG. 3, a first polygon model 311 is generated from the first image 301, and a second polygon model 312 is generated from the second image 302. These polygon models are generated by processing of automatically generating a polygon mesh by either one of the following principles.

Figure 4C:
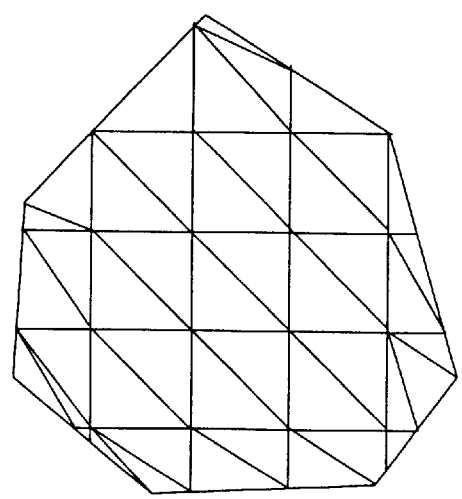
FIGS. 4A to 4C are diagrams showing a first method for generating a polygon mesh of the morphing image processing system of Embodiment 1 of the present invention.
Figure 4B:
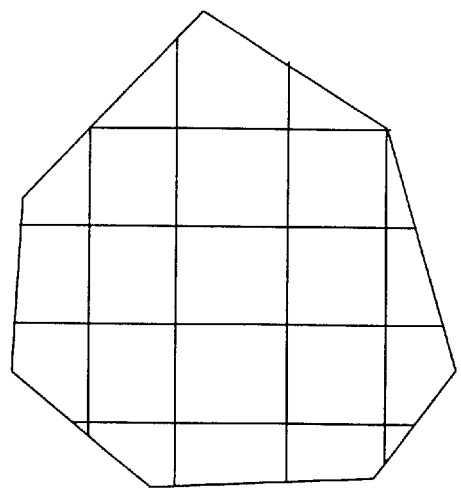
Figure 4A:
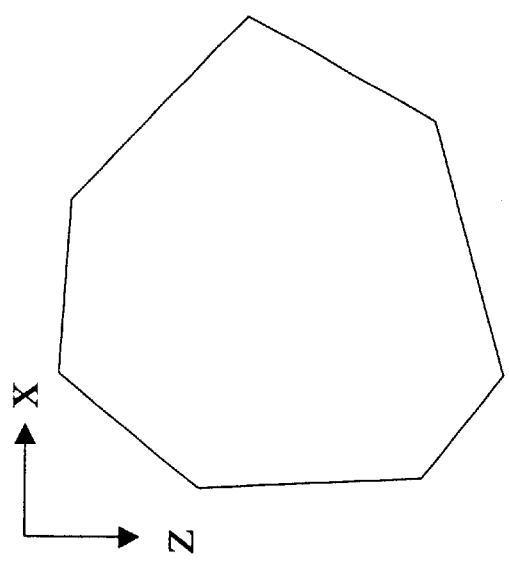

First, a first method for generating a polygon mesh will be described. For simplifying the description, generation of a polygon mesh for a two-dimensional image will be described. As shown in FIG. 4A, a two-dimensional image is input. In this two-dimensional image, lines are drawn in a predetermined previously set pitch in the X axis direction and the Z axis direction (i.e., plane coordinate axis directions). Thus, the image is covered with a grid-like net, as shown in FIG. 4B. Next, a diagonal line is drawn in each segment of the grid. In the peripheral portions of the image where a rectangle is not formed, the segmented small area itself is used as a polygon. A polygon mesh covered with triangle polygons, as shown in FIG. 4C, is formed.

Figure 5C:
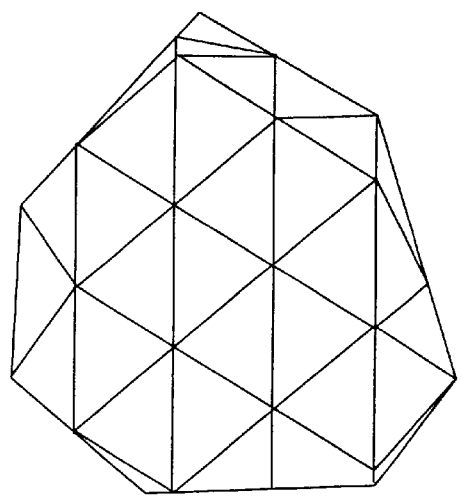
FIGS. 5A to 5C are diagrams showing a second method for generating a polygon mesh of the morphing image processing system of Embodiment 1 of the present invention.
Figure 5B:
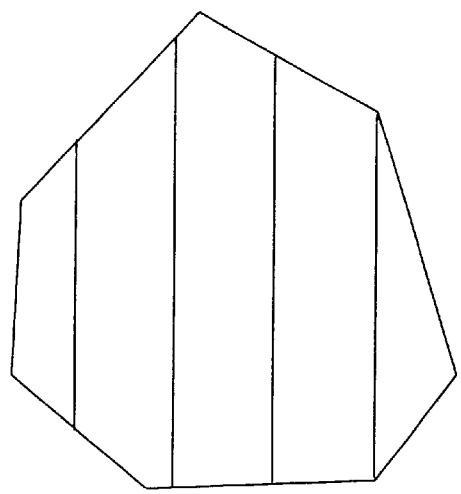
Figure 5A:
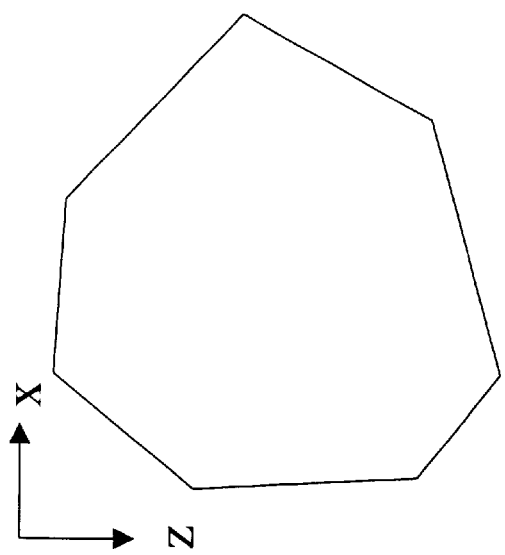

Next, a second method for generating a polygon mesh will be described. For simplifying the description, generation of a polygon mesh for a two-dimensional image will be described. Lines are drawn in a predetermined previously set pitch with respect to one axis direction (the Z axis direction in this case) in the input image shown in FIG. 5A, resulting in the image shown in FIG. 5B. Next, a band defined by the lines is divided into triangles, each of which has a predetermined previously set area. In the peripheral portions that cannot be divided into triangles, the remaining small area is used as a polygon. A polygon mesh covered with triangle polygons, as shown in FIG. 5C, is formed.

Other algorithms for automatically forming a polygon mesh from an input image also can be applied to the present invention.

Even if a polygon mesh is subdivided into too many polygons in Operation 202 so that a large number of polygon vertices are designated, polygon reduction processing in the next operation 203 reduces the number of polygon vertices to an appropriate number. Therefore, morphing processing will not be complicated.

Figure 6C:
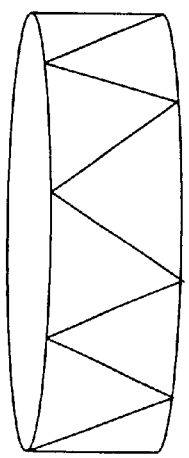
FIGS. 6A to 6C are diagrams showing a method for generating a polygon mesh of a three-dimensional object of the morphing image processing system of Embodiment 1 of the present invention.
Figure 6B:
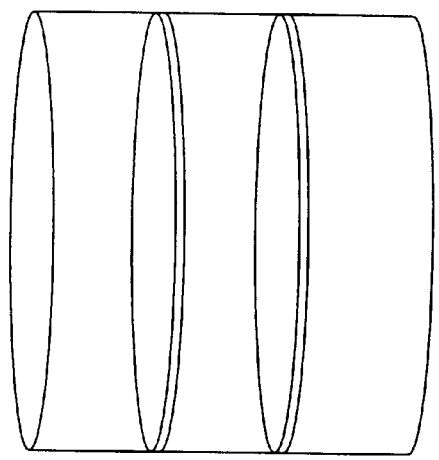
Figure 6A:
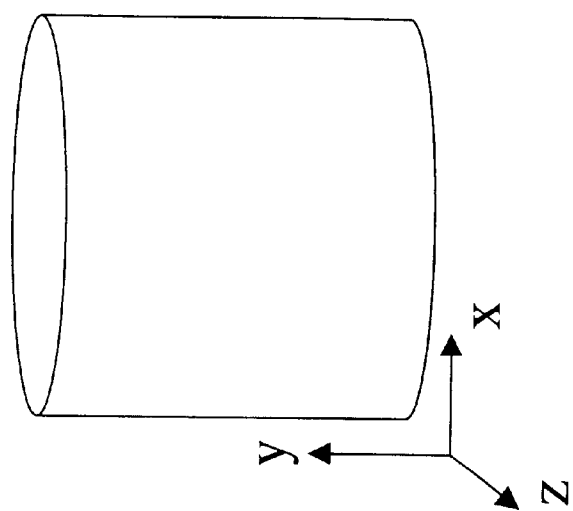

The methods for generating a polygon mesh that have been described above are directed to a two-dimensional image. However, the same can be applied to three-dimensional images. FIGS. 6A to 6C show an example thereof. In the example shown in FIGS. 6A, an input three-dimensional image is divided with respect to the Y axis direction in a predetermined pitch (FIG. 6B), and the obtained band is divided into triangles, each of which has a predetermined previously set area. In the peripheral portions that cannot be divided into triangles, the remaining small area is used as a polygon. Thus, a polygon mesh covered with triangle polygons, as shown in FIG. 6C, is formed.

Now, the processing flow of the morphing image processing system of the present invention will be described further. Polygon reduction processing is performed by the low progression level polygon model generation processing part 30 to generate a first low progression level polygon model from the first polygon model and a second low progression level polygon model from the second polygon model, which are generated by the polygon model generation processing part 20. Then, the generated polygon vertex data on each of progression levels and metadata containing the polygon vertex reduction process are stored (Operation 203). The first metadata corresponds to the first polygon model, and the second metadata corresponds to the second polygon model.

The advantages of using this polygon reduction processing are as follows, for example. First of all, the number of polygon vertices can be reduced, and secondly image quality is not significantly degraded because the polygon vertices are selected for reduction in such a manner that the characteristics of the shape are maintained.

Operation 203 provides a low progression level polygon model represented by a small number of polygon vertices. In FIG. 3, the first low progression level polygon model 321 and the first metadata 331 are generated from the first polygon model 311, and the second low progression level polygon model 322 and the second metadata 332 are generated from the second polygon model 312.

Next, the corresponding polygon vertex specifying part 41 in the low progression level polygon model morphing processing part 40 specifies corresponding vertices between the first low progression level polygon model and the second low progression level polygon model (Operation 204). The corresponding polygon vertex specifying part 41 specifies corresponding vertices as follows.

Figure 7B:
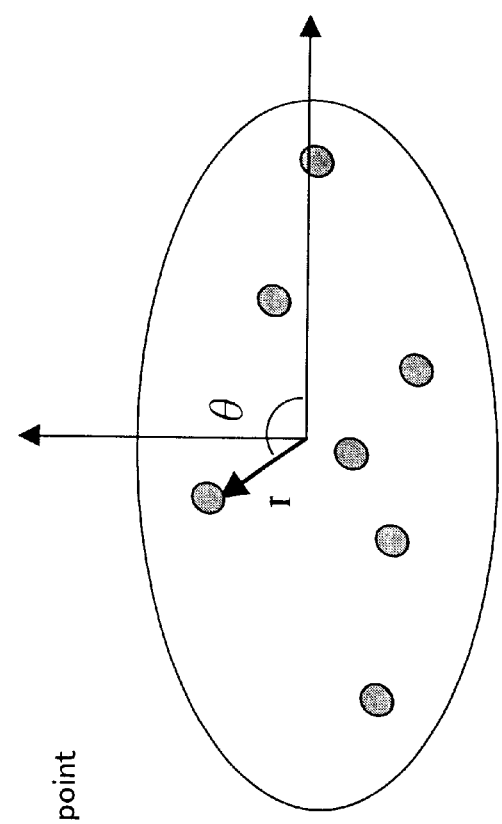
FIGS. 7A and 7B are diagrams showing the concept of corresponding polygon vertex specifying processing of the morphing image processing system of Embodiment 1 of the present invention.
Figure 7A:
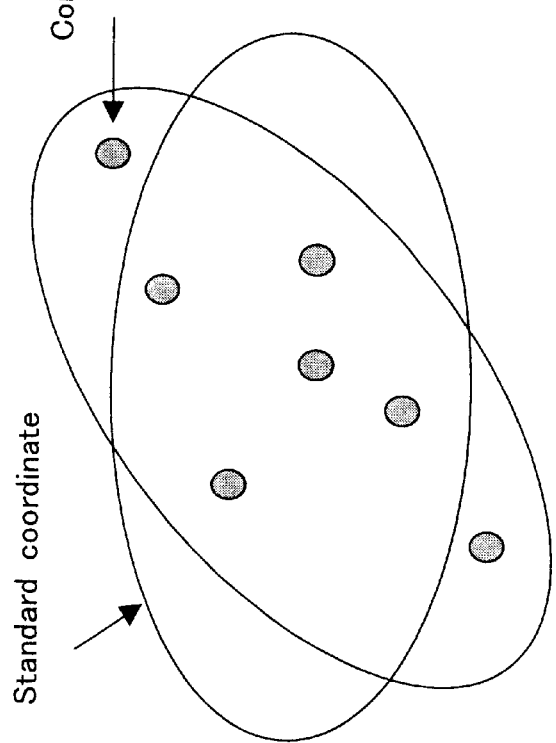

FIGS. 7A and 7B show the concept of specifying corresponding polygon vertices in the case of two-dimensional images. First, as shown in FIG. 7A, the position of the centroid and the standard coordinate for the polygon vertices are obtained. They are calculated based on the coordinate (X0, 0, Z0) of the polygon vertices and the three-dimensional coordinate values with y=0. The vertices of the polygons are represented by the angle "θ" and the distance "r" from the centroid in the standard coordinate, and thus the polygon vertices in the standard coordinate are obtained (FIG. 7B). This processing is performed with respect to the first low progression level polygon model and the second low progression level polygon model so as to specify the corresponding vertices therebetween.

Next, interpolation between the corresponding polygon vertices is performed by the polygon vertex interpolating part 42 of the low progression level polygon model morphing processing part 40 so that intermediate low progression level polygon models defined by the interpolated polygon vertices are formed (Operation 205). Here, the number of intermediate low progression level polygon models to be generated can be predetermined, and can be equal to the number of frames of intermediate images determined by a period of time for image deformation or the number of deformation steps that are input as parameters. An intermediate image is generated based on each of the intermediate low progression level polygon models generated in Operation 205.

In FIG. 3, reference numerals 323*a* and 323*b* are the intermediate low progression level polygon models. Although only two models are shown in FIG. 3, an arbitrary number of intermediate low progression level polygon models are generated in accordance with the intermediate images to be generated.

Next, the intermediate image generation processing part 50 generates intermediate images by interpolation between the first and second images. The intermediate images are generated by performing reproducing processing so as to raise the progression level to the level equal to that of the first and second images. This processing follows procedures in the opposite order of the polygon vertex reduction process by using the metadata generated by the low progression level polygon model generation processing part 30, based on the respective intermediate low progression level polygon models generated by the low progression level polygon model morphing processing part 40 (Operation 206). There are several patterns for the metadata applied to the intermediate low progression level polygon models. One is that either one of the first metadata 331 and the second metadata 332 is applied to all the intermediate low progression level polygon models. Alternatively, the first metadata 331 is applied to an intermediate low progression level polygon 6, model that is approximate to the first low progression level polygon model, and the second metadata 332 is applied to an intermediate low progression level polygon model that is approximate to the second low progression level polygon model. There are other patterns, some of which will be described in the following embodiments. In the example of FIG. 3, the first metadata 331 is applied to the intermediate low progression level polygon model 323a to generate an intermediate polygon model 313a, and then an intermediate image 303a is generated by texture mapping. In the same manner, the second metadata 332 is applied to the intermediate low progression level polygon model 323b to generate an intermediate polygon model 313b, and then an intermediate image 303b is generated by texture mapping.

Finally, the output part 60 outputs a series of generated intermediate images from the first image of the base image to the second image of the target image (Operation 207).

In the example of FIG. 3, the output part 60 outputs the first image 301 of the base image, the intermediate images 303a and 303b and the second image 302 of the target image.

As described above, the morphing image processing system using polygon reduction processing of Embodiment 1 can perform morphing image processing in which the interpolation calculation amount can be reduced by using polygon reduction processing to input images, and that allows high precision images and smooth deformation.

Embodiment 2

A morphing image processing system of Embodiment 2 uses intermediate metadata morphing, whereas Embodiment 1 uses low progression level polygon model morphing. In other words, intermediate metadata morphing is performed to generate intermediate metadata by performing interpolation between the first metadata generated from the first image polygon model by polygon reduction processing and the second metadata generated from the second image polygon model, and then intermediate images are generated using the intermediate metadata.

Figure 8:
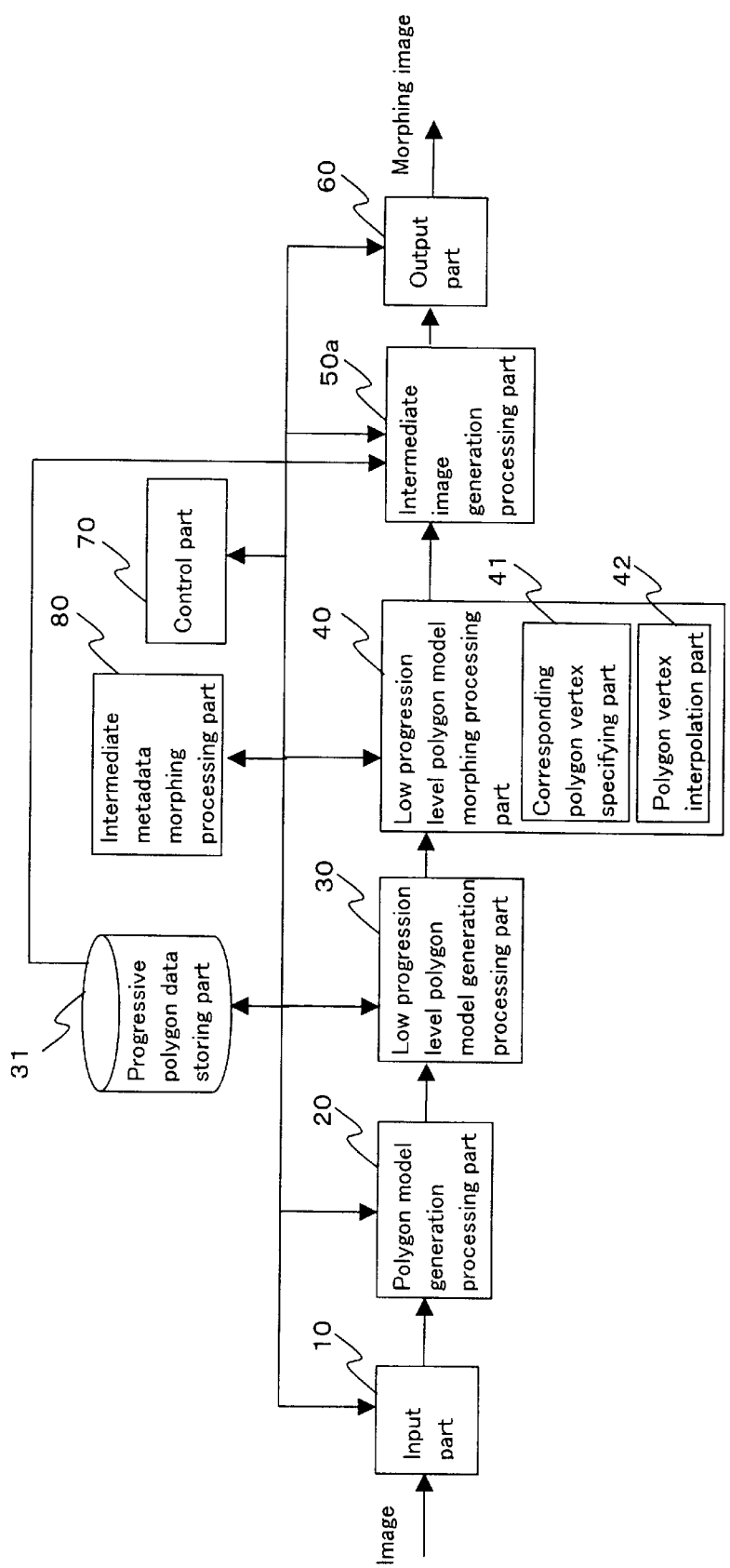
FIG. 8 is a diagram of a schematic configuration of a morphing image processing system of Embodiment 2 of the present invention.

The outline of the entire configuration of the morphing image processing system of Embodiment 2 and the outline of the processing flow of this unit will be described with reference to the accompanying drawings. FIG. 8 shows a schematic configuration of the morphing image processing system of Embodiment 2.

As shown in FIG. 8, the morphing image processing system of Embodiment 2 generally includes an input part 10, a polygon model generation processing part 20, a low progression level polygon model generation processing part 30, a progressive polygon data storing part 31, a low progression level polygon model morphing processing part 40, an intermediate metadata morphing processing part 80, an intermediate image generation processing part 50a, an output part 60, and a control part 70. Although not shown, the morphing image processing system includes memories and devices necessary for control processing of the entire system.

The input part 10, the polygon model generation processing part 20, the low progression level polygon model generation processing part 30, the low progression level polygon model morphing processing part 40, the output part 60, and the control part 70 function in the same manner in Embodiment 1, and therefore will not be described further.

The intermediate metadata morphing processing part 80 forms intermediate metadata by performing interpolation between corresponding elements of the two metadata. This part forms intermediate metadata by performing interpolation between the element of the first metadata and the element of the second metadata generated by the low progression level polygon model generation processing part 30. Thus, by interpolating the intermediate metadata in this manner, a morphing sequence of a series of metadata in which the element of the first metadata is deformed smoothly into the element of the second metadata can be obtained.

The intermediate image generation processing part 50a generates an intermediate image from the low progression level polygon models using the intermediate metadata. There are several patterns for generating intermediate images using the intermediate metadata. The intermediate image generation processing part 50a of Embodiment 2 generates an intermediate image interpolated between the first and second images by performing reproducing processing to the intermediate low progression level polygon models. This processing follows procedures in the opposite order of the polygon vertex reduction process, using the corresponding intermediate metadata so as to raise the progression level to the level equal to that of the first and second images.

Figure 9:
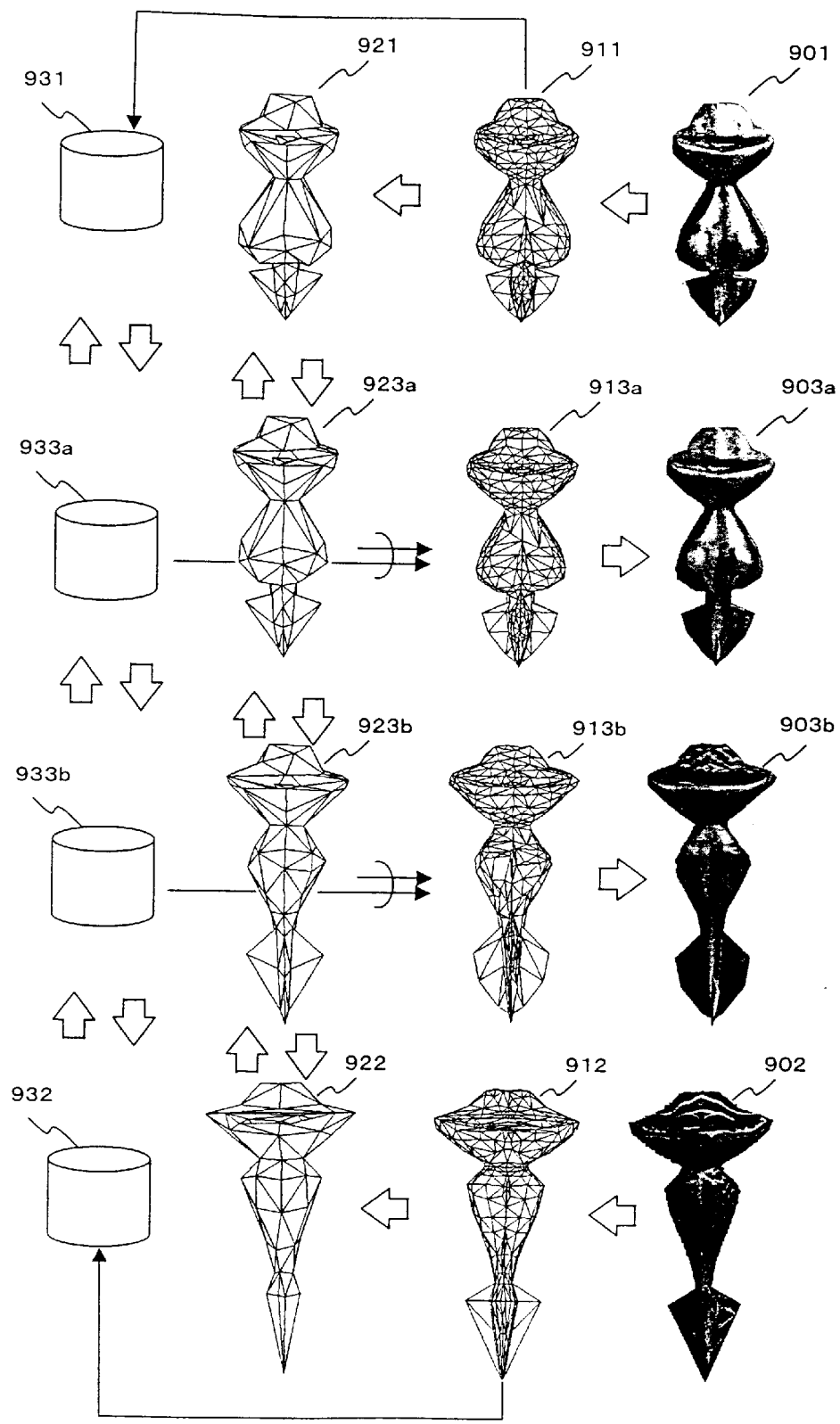
FIG. 9 is a diagram showing the manner in which morphing images are being generated by the morphing image processing system of Embodiment 2 of the present invention.

The concept of the processing of Embodiment 2 using the intermediate image generation processing part 50a will be described with reference to FIG. 9. FIG. 9 is a diagram showing the manner in which morphing images are being generated by the morphing image processing system of Embodiment 2.

In FIG. 9, the first image of the base image is denoted by 901, and the second image of the target image is denoted by 902. A first polygon model 911 is generated from the first image 901, and a second polygon model 912 is generated from the first image 902. When polygon reduction processing is performed to these images by the low progression level polygon model generation processing part 30, the first low progression level polygon model 921 and the first metadata 931, and the second low progression level polygon model 922 and the second metadata 932 are generated. Next, interpolation is performed to each of the low progression level polygon model and the metadata so that a morphing sequence is generated. In other words, intermediate low progression level polygon models 923a and 923b are generated by performing interpolation between the first low progression level polygon model 921 and the second low progression level polygon model 922, using the low progression level polygon model morphing processing part 40, and intermediate metadata 933a and 933b are generated by performing interpolation between the first metadata 931 and the second metadata 932, using the intermediate metadata morphing processing part 80.

In this case, when the number of steps for interpolation processing of the low progression level polygon model morphing processing part 40 is the same as that of the intermediate metadata morphing processing part 80, the intermediate low progression level polygon models and the intermediate metadata are generated in the same number, so that one-to-one correspondence is achieved.

The intermediate image generation processing part 50a generates intermediate images corresponding to the intermediate low progression level polygon models, using the corresponding intermediate metadata. In other words, in FIG. 9, an intermediate polygon model 913a is generated with respect to the intermediate low progression level polygon model 923a using the intermediate metadata 933a, and then an intermediate image 903a is generated by texture mapping. In the same manner, an intermediate polygon model 913b is generated with respect to the intermediate low progression level polygon model 923b using the intermediate metadata 933b, and then an intermediate image 903b is generated by texture mapping.

Finally, the output part 60 outputs the first image 901 of the base image, the intermediate images 903a and 903b and the second image 902 of the target image.

As described above, according to the morphing image processing system using polygon reduction processing of Embodiment 2, intermediate images can be generated using the intermediate metadata generated by intermediate metadata morphing that performs interpolation between the first metadata and the second metadata. Since this embodiment uses the intermediate metadata that corresponds to the intermediate low progression level polygon models on the one-to-one basis, intermediate images with a higher precision can be obtained.

Embodiment 3

A morphing image processing system of Embodiment 3 uses intermediate metadata morphing in the same as in Embodiment 2. However, Embodiment 3 is different from Embodiment 2 in using a different pattern of processing for generating intermediate images from the low progression level polygon model, using the intermediate metadata.

Figure 10:
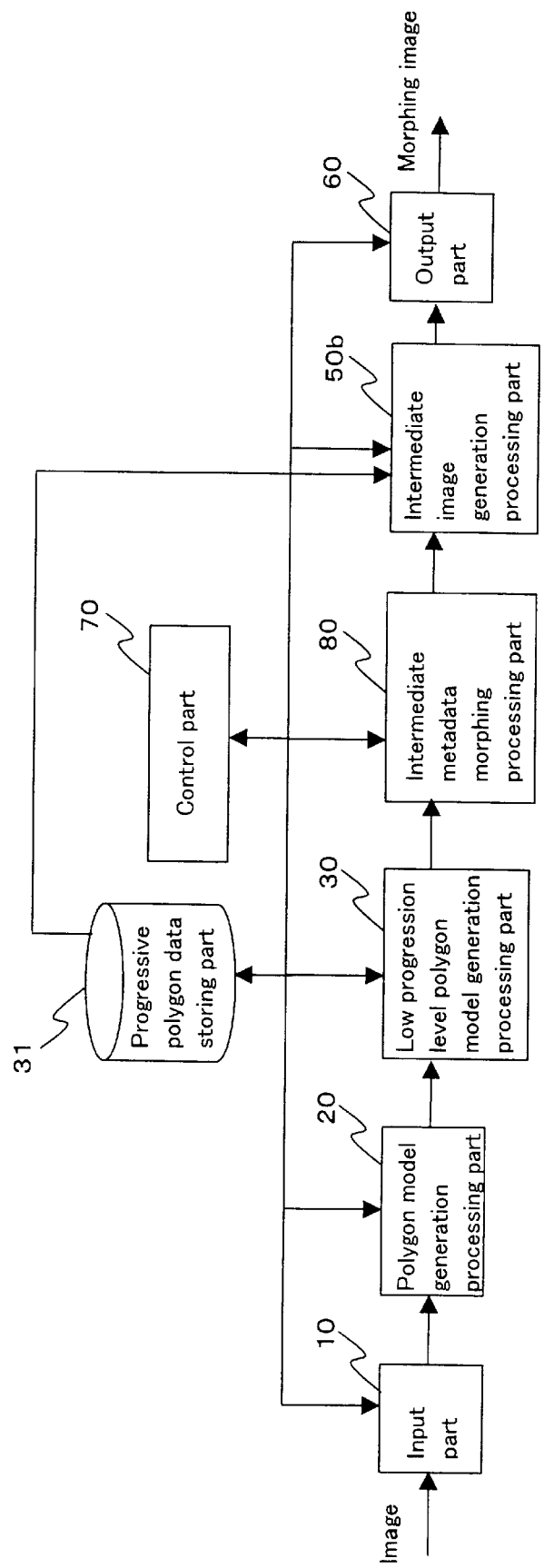
FIG. 10 is a diagram of a schematic configuration of a morphing image processing system of Embodiment 3 of the present invention.

The outline of the entire configuration of the morphing image processing system of Embodiment 3 and the outline of the processing flow of this unit will be described with reference to the accompanying drawings. FIG. 10 shows a schematic configuration of the morphing image processing system of Embodiment 3.

As shown in FIG. 10, the morphing image processing system of Embodiment 3 generally includes an input part 10, a polygon model generation processing part 20, a low progression level polygon model generation processing part 30, a progressive polygon data storing part 31, an intermediate metadata morphing processing part 80, an intermediate image generation processing part 50b, an output part 60, and a control part 70. In Embodiment 3, the low progression level polygon model morphing processing part 40, which is a component of Embodiment 2, is not essential. Although not shown, the morphing image processing system includes controllers, memories and devices necessary for control processing of the entire system.

The input part 10, the polygon model generation processing part 20, the low progression level polygon model generation processing part 30, the output part 60, the control part 70, and the intermediate metadata morphing processing part 80 function in the same manner in Embodiments 1 and 2, and therefore will not be described further.

The intermediate image generation processing part 50b generates intermediate images from the low progression level polygon models using the intermediate metadata. The intermediate image generation processing part 50b in Embodiment 3 generates morphing images by generating intermediate images sequentially using the intermediate metadata with respect to the first low progression level polygon model generated from the first image of the base image.

Figure 11:
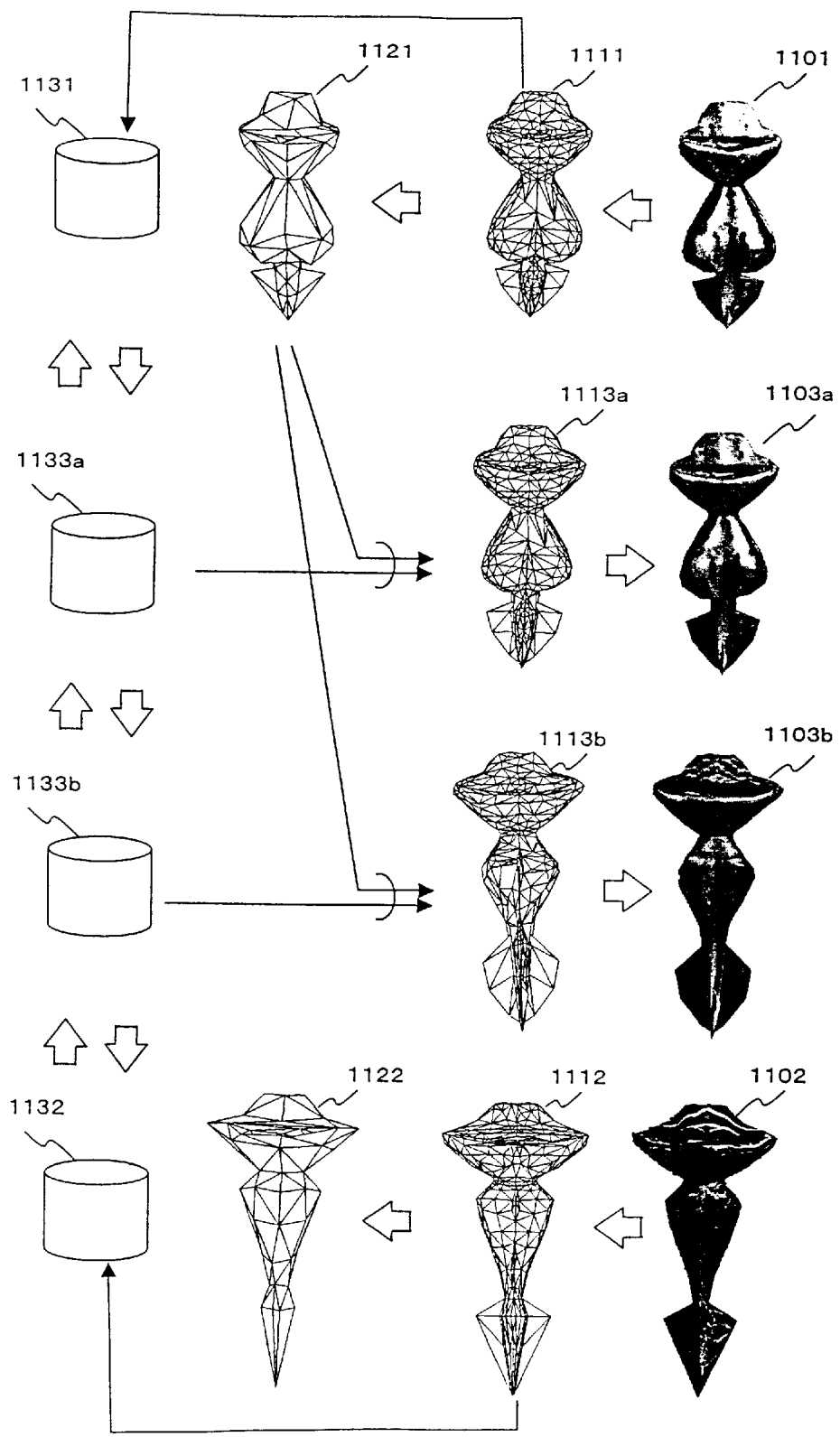
FIG. 11 is a diagram showing the manner in which morphing images are being generated by the morphing image processing system of Embodiment 3 of the present invention.

The concept of the processing of Embodiment 3 using the intermediate image generation processing part 50b will be described with reference to FIG. 11. FIG. 11 is a diagram showing the manner in which morphing images are being generated by the morphing image processing system of Embodiment 3.

In FIG. 11, the first image of the base image is denoted by 1101, and the second image of the target image is denoted by 1102. A first polygon model 1111 is generated from the first image 1101, and a second polygon model 1112 is generated from the first image 1102. When polygon reduction processing is performed to these polygon models by the low progression level polygon model generation processing part 30, the first low progression level polygon model 1121 and the first metadata 1131 are generated from the first polygon mode 1111, and the second low progression level polygon model 1122 and the second metadata 1132 are generated from the second polygon model 1112. Next, intermediate metadata 1133a and 1133b are generated by performing interpolation between the first metadata 1131 and the second metadata 1132 using the intermediate metadata morphing processing part 80.

The intermediate image generation processing part 50b applies the intermediate metadata sequentially to the first low progression level polygon models to generate intermediate images. In other words, in FIG. 11, an intermediate polygon model 1113a is generated with respect to the first low progression level polygon model 1121 using the intermediate metadata 1133a, and then an intermediate image 1103a is generated by texture mapping. In the same manner, an intermediate polygon model 1113b is generated with respect to the low progression level polygon model 1121 using the intermediate metadata 1133b, and then an intermediate image 1103b is generated by texture mapping.

Finally, the output part 60 outputs the first image 1101 of the base image, the intermediate images 1103a and 1103b and the second image 1102 of the target image.

As described above, according to the morphing image processing system of Embodiment 3, intermediate images can be generated using the intermediate metadata generated by intermediate metadata morphing that performs interpolation between the first metadata and the second metadata. Intermediate images can be obtained sequentially using the intermediate metadata with respect to the first low progression level polygon model.

Figure 12:
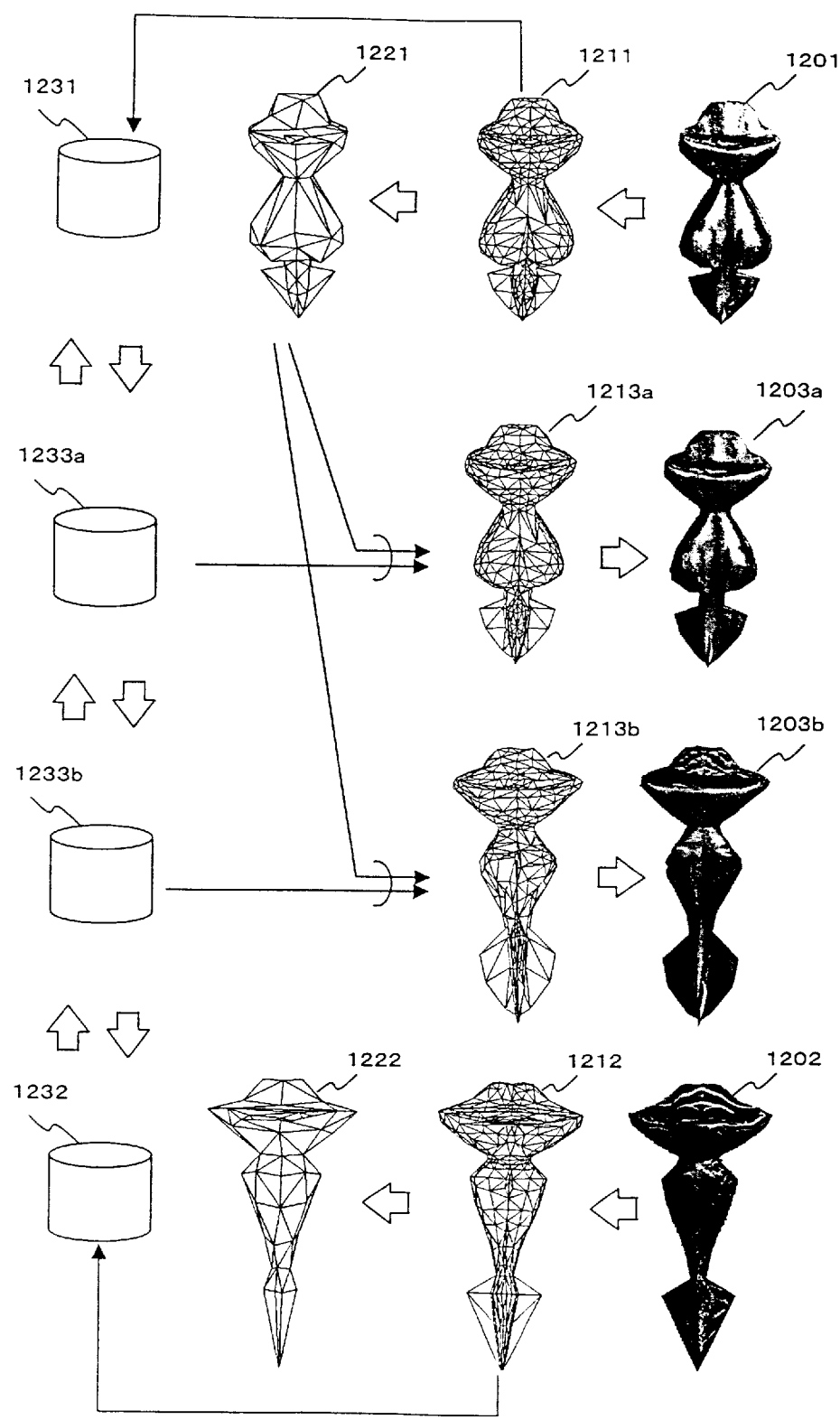
FIG. 12 is a diagram showing the manner in which morphing images are being generated in another pattern by the morphing image processing system of Embodiment 3 of the present invention.

It is possible to use a different type of intermediate metadata from the above example. In the above example, the intermediate metadata 1133a and 1133b interposed between the first metadata 1131 and the second metadata 1132 are generated in the intermediate metadata generation processing by the morphing processing part 80. However, there is an example where a difference value from the first metadata is stored as intermediate metadata. FIG. 12 is a diagram showing the manner in which morphing images are being generated by another pattern of Embodiment 3. In the same as in FIG. 11, in FIG. 12, the first image of the base image is denoted by 1201, and the second image of the target image is denoted by 1202. A first polygon model 1211 is generated from the first image 1201, and a first low progression level polygon model 1221 and first metadata 1231 are generated by polygon reduction processing. In the same manner, a second polygon model 1212 is generated from the second image 1202, and a second low progression level polygon model 1222 and second metadata 1232 are generated by polygon reduction processing. Next, intermediate metadata are generated by performing interpolation between the first metadata 1231 and the second metadata 1232, using the intermediate metadata morphing processing part 80, and the difference values 1233*a* and 1233*b* from the first and second metadata are stored.

The intermediate polygon model 1213*a* is generated with respect to the first low progression level polygon model 1221 using the first metadata 1231 and the difference value 1233*a*, and then an intermediate image 1203*a* is generated by texture mapping. In the same manner, an intermediate polygon model 1213*b* is generated with respect to the low progression level polygon model 1221 using the first metadata 1231 and the difference value 1233*b*, and then an intermediate image 1203*b* is generated by texture mapping.

As described above, according to the morphing image processing system of Embodiment 3, intermediate images can be generated using the difference value of the intermediate metadata so that the data amount of the intermediate metadata to be stored can be reduced.

Embodiment 4

It is desirable in executing the morphing processing that the number of the control points of the first image of the base image is equal to that of the second image of the target image from the beginning, and that the correspondence between the control points is predetermined. However, the number of the control points is not necessarily the same between the first and second images, for example in the case where the difference in shape therebetween is large. A morphing image processing system of Embodiment 4 has a function of specifying corresponding control points, even if there is a difference in number of the control points between the first and second images, by adjusting the difference in number of the control points therebetween by interpolation.

Figure 13:
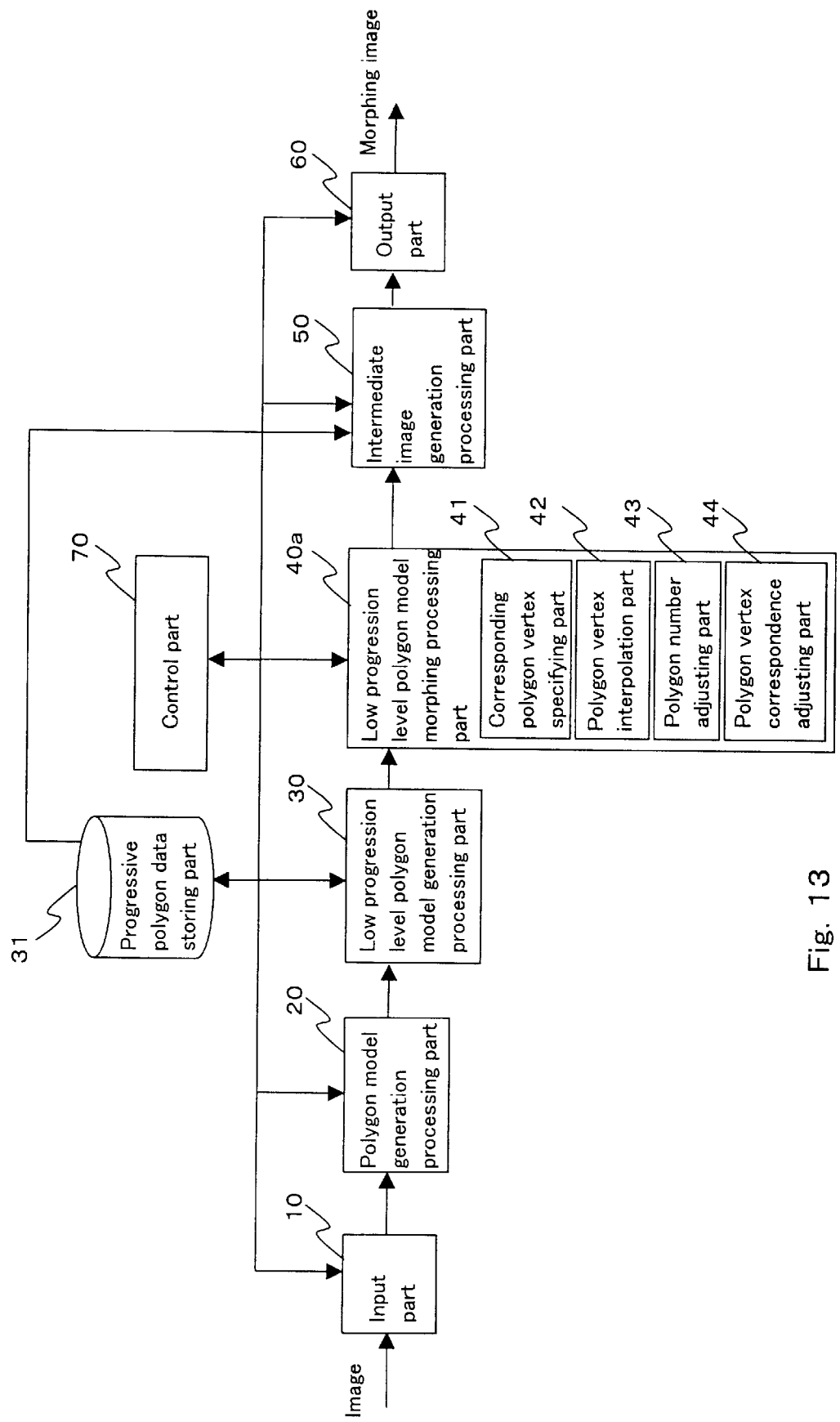
FIG. 13 is a diagram of a schematic configuration of a morphing image processing system of Embodiment 4 of the present invention.

The outline of the entire configuration of the morphing image processing system of Embodiment 4 and the outline of the processing flow of this unit will be described with reference to the accompanying drawings. FIG. 13 shows a schematic configuration of the unit of this embodiment.

As shown in FIG. 13, the morphing image processing system of Embodiment 4 generally includes an input part 10, a polygon model generation processing part 20, a low progression level polygon model generation processing part 30, a progressive polygon data storing part 31, a low progression level polygon model morphing processing part 40*a*, an intermediate image generation processing part 50, an output part 60, and a control part 70. In Embodiment 4, the low progression level polygon model morphing processing part 40*a* further includes a part for adjusting the number of polygons (hereinafter, referred to as polygon number adjusting part 43) and a part for adjusting the correspondence of the polygon vertices (hereinafter, referred to as polygon vertex correspondence adjusting part 44). Although not shown, the morphing image processing system includes controllers, memories and devices necessary for control processing of the entire system.

The input part 10, the polygon model generation processing part 20, the low progression level polygon model generation processing part 30, the intermediate image generation processing part 50, the output part 60, and the control part 70 function in the same manner in Embodiment 1, and therefore will not be described further.

The polygon number adjusting part 43 in the low progression level polygon model morphing processing part 40*a* examines the difference in the number of polygon vertices between the first low progression level polygon model and the second low progression level polygon model generated by the low progression level polygon model generation processing part 30. Then, the part 40*a* feeds back to the low progression level polygon model generation processing part 30 about the increase or decrease of the level of the progressive polygons of either one of the first and second low progression level polygon models (e.g., increasing the number of the polygon vertices that is smaller) so that the number of the polygon vertices is equal between them, and then instructs the low progression level polygon model generation processing part 30 to recreate a low progression level polygon model. This adjustment of the number of polygons can be performed with respect to the entire image or a partial designated region of the image.

The polygon vertex correspondence adjusting part 44 adjusts the difference in number of the polygon vertices between the first and second low progression level polygon models generated by the low progression level polygon model generation processing part 30 by interpolation to specify corresponding polygon vertices.

FIGS. 14A to 14C are diagrams illustrating the concept of corresponding polygon vertex specifying processing by the polygon vertex correspondence adjusting part 44. FIG. 14A shows an example of the first low progression level polygon model generated from the base image. FIG. 14B shows an example of the second low progression level polygon model generated from the target image. In this example, the polygon vertex corresponding to A7 in the FIG. 14A is not present in FIG. 14B. Now, it is assumed that A0 to A6 correspond to Z0 to Z6, respectively. A7 and Z7 are made to be corresponding vertices by the polygon vertex correspondence adjusting part 44 in the following manner.

A vertex having no corresponding vertex in the standardized polygon models is specified. In this example, that vertex is A7.

Then, two vertices in the neighborhood of the vertex having no corresponding vertex with an angle θ are specified. In this example, these vertices are A1 and A5.

Then, in FIG. 14B, vertices corresponding to the neighboring vertices specified in the above are specified. In this example, these vertices are Z1 and Z5.

Figure 15B:
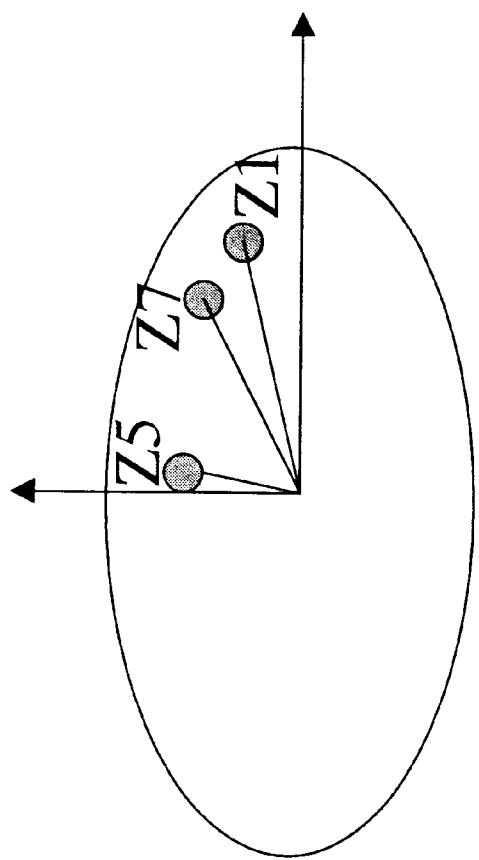
FIGS. 15A to 15B are diagrams showing the manner in which the coordinate of a vertex having no corresponding vertex is calculated.
Figure 15A:
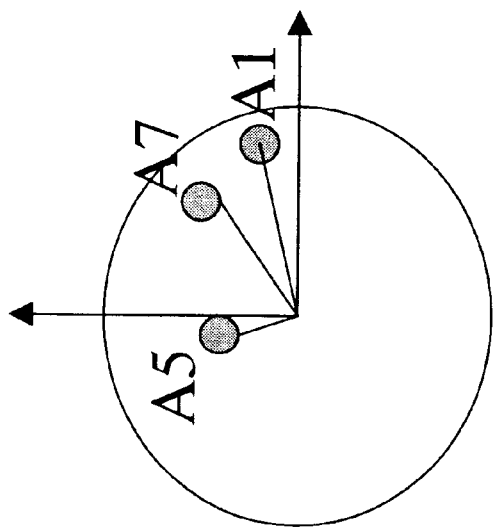

Then, the coordinate of the vertex A7 having no corresponding vertex is calculated. This calculation can be performed using the following equations based on the relationship of the angle and the distance between the standard coordinates of the first and second low progression level polygon models shown in FIGS. 15A and 15B.

The angle $\theta_{Z7}$ of Z7 is:

$$\theta_{Z7} = \theta_{A7} \times (\theta_{Z5} - \theta_{Z1})/(\theta_{A5} - \theta_{A1}) + \theta_{Z1}$$

The distance $r_{Z7}$ of Z7 is:

$$r_{Z7} = r_{A7} \times (r_{Z5} - r_{Z1})/(r_{A5} - r_{A1}) + r_{Z1}$$

In this manner, the polygon vertex Z7 corresponding to the polygon vertex A7 is obtained, and a new vertex Z7 can be provided, as shown in FIG. 14C. Thus, the corresponding polygon vertices are made between the first and second low progression level polygon models.

As described above, the morphing image processing system of Embodiment 4 can specify corresponding vertices, even if there is a difference in number of the control points between the base image and the target image, by adjusting the difference in number of the vertices therebetween by interpolation.

Embodiment 5

In some cases when executing morphing process in a character such as a creature, morphing with a large number of steps may be required. For example, in the case of a creature character, the portion of the eyes plays an important role and has high visibility, and therefore it requires morphing with a large number of steps. A morphing image processing system of Embodiment 5 can designate a partial region of an image and selects the degree of detail of morphing for the region, namely, can designate an image region to which to perform rough morphing for a general outline and an image region to which to perform morphing with a large number of steps to show details.

Figure 16:
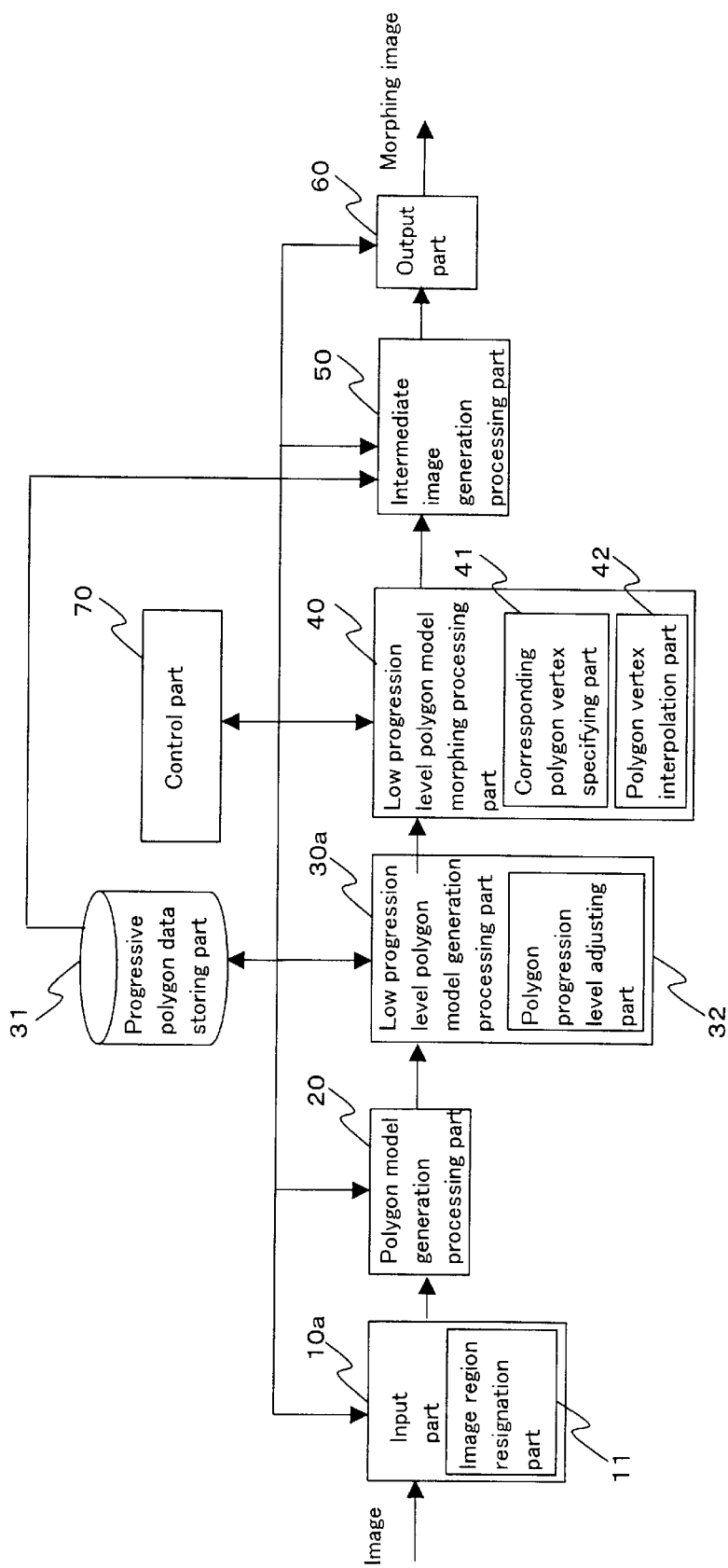
FIG. 16 is a diagram of a schematic configuration of a morphing image processing system of Embodiment 5 of the present invention.

The outline of the entire configuration of the morphing image processing system of Embodiment 5 and the outline of the processing flow of this unit will be described with reference to the accompanying drawings. FIG. 16 shows a schematic configuration of the morphing image processing system of Embodiment 5.

As shown in FIG. 16, the morphing image processing system of Embodiment 5 generally includes an input part 10a, a polygon model generation processing part 20, a low progression level polygon model generation processing part 30a, a progressive polygon data storing part 31, a low progression level polygon model morphing processing part 40, an intermediate image generation processing part 50, an output part 60, and a control part 70.

In Embodiment 5, the input part 10a includes an image region designation part 11, and the low progression level polygon model generation processing part 30a includes a polygon progression level adjusting part 32. Although not shown, the morphing image processing system includes controllers, memories and devices necessary for control processing of the entire system.

The polygon model generation processing part 20, the low progression level polygon model morphing processing part 40, the intermediate image generation processing part 50, the output part 60, and the control part 70 function in the same manner in Embodiment 1, and therefore will not be described further.

The image region designation part 11 of the input part 10a through which a user of the unit designates an image region requiring morphing with a large number of steps to show details because of its importance in an input image, and designates the degree of detail for the region. It is possible to set the detail degree for each image region. This may be performed when an image is input. Alternatively, as described later, it is possible to designate an important image region portion after polygon reduction is executed by the low progression level polygon model generation processing part 30a. The degree of detail can be designated by specifying the number of polygons, or can be designated by specifying a level such as level 10 or level 100.

The polygon model generation processing part 20 generates a polygon mesh from input images in the same manner as in Embodiment 1, so that polygon models are obtained.

Figure 17A:
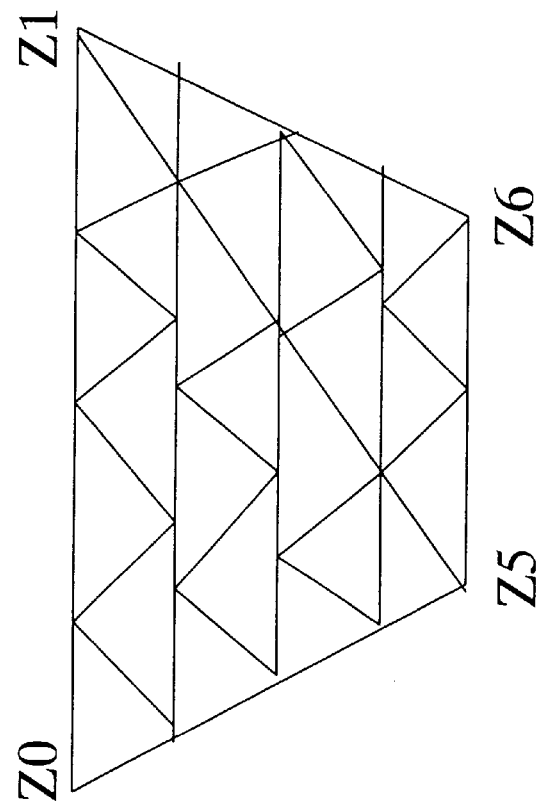
FIGS. 17A and 17B are diagrams showing the manner in which the polygon progression level is adjusted in an image region.

The low progression level polygon model generation processing part 30a executes polygon reduction processing in accordance with the previously set progression level over the entire image, as described in Embodiment 1, so that low progression level polygon models are generated. For example, as shown in FIG. 17A, the number of polygons is reduced even in a region including the eyes of an artificial creature to Z0 to Z6.

Then, the image region designation part 11 designates an image region in which it is desired to perform morphing with a large number of steps for details in the low progression level polygon model. In the example of FIG. 17A, the image region of Z0–Z1–Z6–Z5 and the degree of detail for this region are designated.

Figure 17B:
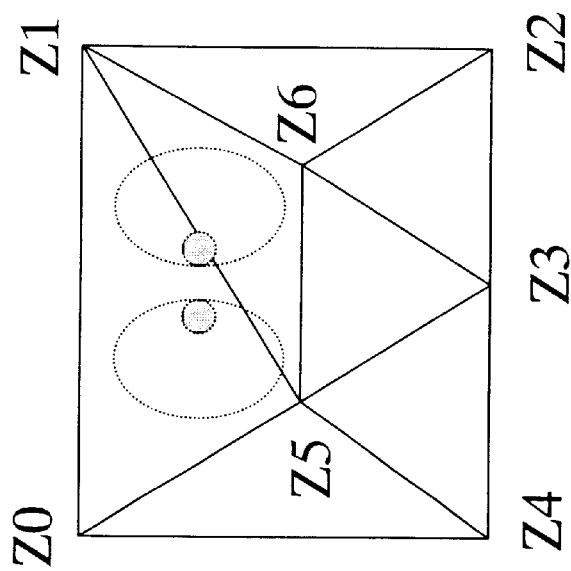

Then, the polygon progression level adjusting part 32 adjusts the progression level in accordance with the designated degree of detail, and instructs the low progression level polygon model generation processing part 30a to execute polygon reduction processing only to this region again. As shown in FIG. 17B, a polygon mesh in the image region of Z0–Z1–Z6–Z5 is subdivided.

The above processing is performed to the first image of the base image and the second image of the target image. The subsequent processing of the low progression level polygon model morphing processing part 40 and the intermediate image generation processing 50 can be performed in the same manner as in Embodiment 1.

The morphing image processing system of Embodiment 5 can execute morphing processing in accordance with the degree of detail of morphing for each region by designating a partial region of the image.

Embodiment 6

Figure 18:
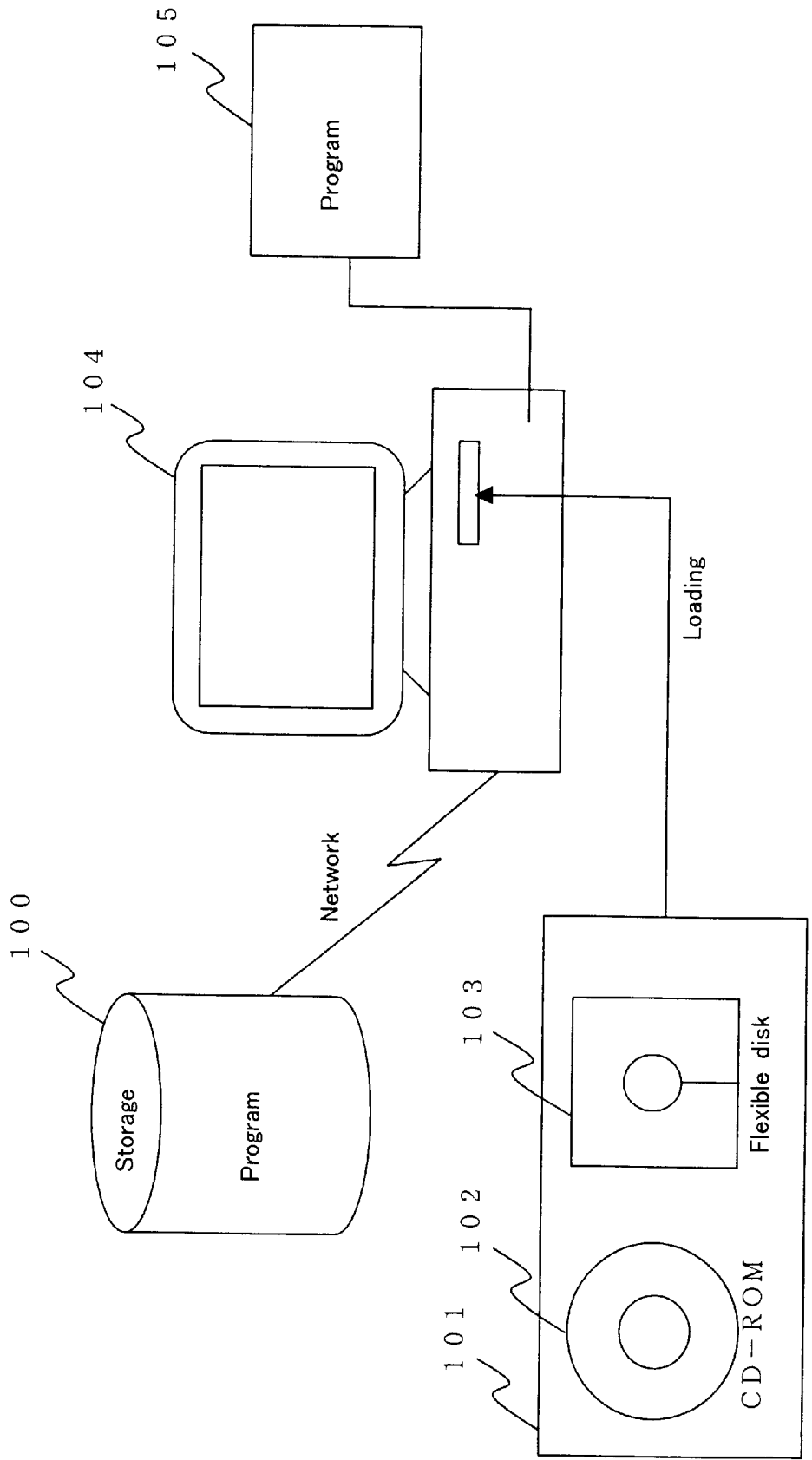
FIG. 18 is a diagram showing an example of a recording medium.

The morphing image processing system according to the present invention can be configured by various computers by recording a program including the processing operations for realizing the configurations as described above on a computer-readable recording medium. As in an example shown in FIG. 18, the recording medium, on which the program provided with the processing operations realizing the message processing system according to the present invention is recorded, can be not only a portable recording medium 101 such as a CD-ROM 102 or a flexible disk 103, but also a recording medium 100 in a recording device on the network, a recording medium 105 such as a hard disk or a RAM in computers. When executing the program, the program is loaded into a computer 104 and executed in its main memory.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A morphing image processing system for performing morphing processing for deforming a first image smoothly into a second image while forming intermediate images interpolated between the first image and the second image, the morphing image processing system using polygon reduction processing, comprising:

a low progression level polygon model generation processing part for performing polygon reduction processing to a first polygon model corresponding to the first image and a second polygon model corresponding to the second image to generate a first low progression level polygon model and a second low progression level polygon model having a reduced number of polygon vertices, wherein the polygon reduction processing is for obtaining polygon vertex data on each progression level and metadata, and a polygon vertex reduction process is recorded in the metadata;

a low progression level polygon model morphing processing part for specifying corresponding vertices between the first low progression level polygon model and the second low progression level polygon model and forming intermediate low progression level polygon models interpolated between the first low progression level polygon model and the second low progression level polygon model at a predetermined number of steps of deformation; and an intermediate image generation processing part for performing reproducing processing to generate intermediate images between the first and second images by using the metadata, based on the respective intermediate low progression level polygon models, wherein the reproducing processing follows procedures in the opposite order of the polygon vertex reduction process.

2. The morphing image processing system using polygon reduction processing according to claim 1,
wherein as the metadata used in the reproducing processing of the morphing intermediate image generation processing, metadata obtained by the following manner is used:
obtaining a data change (first data change) from the first low progression level polygon model to the corresponding intermediate low progression level polygon model;
obtaining a data change (second data change) from the second low progression level polygon model to the corresponding intermediate low progression level polygon model;
comparing the first data change and the second data change; and
obtaining metadata corresponding to the low progression level polygon model that has a smaller data change;
the thus obtained metadata is used for each of the intermediate low progression level polygon models.

3. The morphing image processing system using polygon reduction processing according to claim 1, comprising an intermediate metadata morphing processing part for generating intermediate metadata interpolated between first metadata corresponding to the first low progression level polygon model generated in the low progression level polygon model generation processing and second metadata corresponding to the second low progression level polygon model generated in the low progression level polygon model generation processing, the intermediate metadata corresponding to respective intermediate low progression level polygon models,
wherein as the metadata used in the reproducing processing of the morphing intermediate image generation processing, corresponding metadata are used for respective intermediate low progression level polygon models.

4. The morphing image processing system using polygon reduction processing according to claim 3, wherein data of a difference from the first metadata are stored as the intermediate metadata.

5. The morphing image processing system using polygon reduction processing according to claim 1,
wherein, a polygon model represented with a polygon mesh covered with triangle polygons is generated in the polygon model generation processing,
the triangle polygons are obtained by applying a grid with crossed lines extending in each axis direction at predetermined intervals over an image and dividing each region defined by the lines by a predetermined area into triangles having an equal area, and
in portions whose area is smaller than the predetermined area, the region defined by the lines serves as the triangle polygon.

6. The morphing image processing system according to claim 1, comprising an image region designation part and a polygon progression level adjusting part, wherein the image region designation part designates an image region in an input image,
the polygon progression level adjusting part adjusts a progression level of polygons in the image region designated by the image region designation part to adjust the number of polygons after the polygon reduction processing by the low progression level polygon model generation processing part, and
the morphing image processing system generates a low progression level polygon model whose polygon progression level is adjusted for each image region from a level of the input image.

7. The morphing image processing system according to claim 1, wherein the low progression level polygon model morphing processing part generates a new vertex in a second low progression level polygon model corresponding to a vertex in the first low progression level polygon model that has no corresponding vertex in the second low progression level polygon model, based on a result of sorting based on an angle and a distance from a centroid of polygon vertices of a standard coordinate.

8. The morphing image processing system according to claim 1, comprising a polygon model generation processing part for generating a first polygon model representing the first image with a polygon mesh and a second polygon model representing the second image with a polygon mesh, in a case where the input first image and the input second image are not represented with polygon data.

9. The morphing image processing system using polygon reduction processing according to claim 8,
wherein as the metadata used in the reproducing processing of the morphing intermediate image generation processing, metadata obtained by the following manner is used:
obtaining a data change (first data change) from the first low progression level polygon model to the corresponding intermediate low progression level polygon model;
obtaining a data change (second data change) from the second low progression level polygon model to the corresponding intermediate low progression level polygon model;
comparing the first data change and the second data change; and
obtaining metadata corresponding to the low progression level polygon model that has a smaller data change;
the thus obtained metadata is used for each of the intermediate low progression level polygon models.

10. The morphing image processing system using polygon reduction processing according to claim 8, comprising an intermediate metadata morphing processing part for generating intermediate metadata interpolated between first metadata corresponding to the first low progression level polygon model generated in the low progression level polygon model generation processing and second metadata corresponding to the second low progression level polygon model generated in the low progression level polygon model generation processing, the intermediate metadata corresponding to respective intermediate low progression level polygon models,
wherein as the metadata used in the reproducing processing of the morphing intermediate image generation processing, corresponding metadata are used for respective intermediate low progression level polygon models.

11. The morphing image processing system using polygon reduction processing according to claim 10, wherein data of a difference from the first metadata are stored as the intermediate metadata.

12. The morphing image processing system using polygon reduction processing according to claim 8, wherein, a polygon model represented with a polygon mesh covered with triangle polygons is generated in the polygon model generation processing, the triangle polygons are obtained by applying a grid with crossed lines extending in each axis direction at predetermined intervals over an image and dividing each region defined by the lines by a predetermined area into triangles having an equal area, and in portions whose area is smaller than the predetermined area, the region defined by the lines serves as the triangle polygon.

13. The morphing image processing system according to claim 8, comprising an image region designation part and a polygon progression level adjusting part, wherein the image region designation part designates an image region in an input image, the polygon progression level adjusting part adjusts a progression level of polygons in the image region designated by the image region designation part to adjust the number of polygons after the polygon reduction processing by the low progression level polygon model generation processing part, and the morphing image processing system generates a low progression level polygon model whose polygon progression level is adjusted for each image region from a level of the input image.

14. The morphing image processing system according to claim 8, wherein the low progression level polygon model morphing processing part generates a new vertex in a second low progression level polygon model corresponding to a vertex in the first low progression level polygon model that has no corresponding vertex in the second low progression level polygon model, based on a result of sorting based on an angle and a distance from a centroid of polygon vertices of a standard coordinate.

15. A morphing image processing system for performing morphing processing for deforming a first image smoothly into a second image while forming intermediate images interpolated between the first image and the second image, the morphing image processing system using polygon reduction processing, comprising:

a polygon model generation processing part for generating a first polygon model, regarding characteristic points of the first image as polygon vertices, and a second polygon model, regarding characteristic points of the second image as polygon vertices;

a low progression level polygon model generation processing part for performing polygon reduction processing to the first polygon model and the second polygon model to generate a first low progression level polygon model and a second low progression level polygon model having a reduced number of polygon vertices, wherein the polygon reduction processing is for obtaining polygon vertex data on each progression level and metadata, and a polygon vertex reduction process is recorded in the metadata;

an intermediate metadata morphing processing system for generating intermediate metadata interpolated between first metadata corresponding to the first low progression level polygon model and second metadata corresponding to the second low progression level polygon model; and a morphing intermediate image generation processing part for performing reproducing processing to the first low progression level polygon model to generate intermediate images between the first and second images by using each of the intermediate metadata, wherein the reproducing processing follows procedures in the opposite order of the polygon vertex reduction process.

16. The morphing image processing system using polygon reduction processing according to claim 15, wherein data of a difference from the first metadata are stored as the intermediate metadata.

17. A method of morphing processing for deforming a first image smoothly into a second image while forming intermediate images interpolated between the first image and the second image, the method using polygon reduction processing, comprising:

low progression level polygon model generation processing for performing polygon reduction processing to a first polygon model corresponding to the first image and a second polygon model corresponding to the second image to generate a first low progression level polygon model and a second low progression level polygon model having a reduced number of polygon vertices, wherein the polygon reduction processing is for obtaining polygon vertex data on each progression level and metadata, and a polygon vertex reduction process is recorded in the metadata;

low progression level polygon model morphing processing for specifying corresponding vertices between the first low progression level polygon model and the second low progression level polygon model and forming intermediate low progression level polygon models interpolated between the first low progression level polygon model and the second low progression level polygon model at a predetermined number of steps of deformation; and intermediate image generation processing for performing reproducing processing to generate intermediate images between the first and second images by using the metadata, based on the respective intermediate low progression level polygon models, wherein the reproducing processing follows procedures in the opposite order of the polygon vertex reduction process.

18. The method of morphing processing using polygon reduction processing according to claim 17, comprising intermediate metadata morphing processing for generating intermediate metadata interpolated between first metadata corresponding to the first low progression level polygon model generated in the low progression level polygon model generation processing and second metadata corresponding to the second low progression level polygon model generated in the low progression level polygon model generation processing, the intermediate metadata corresponding to respective intermediate low progression level polygon models, wherein as the metadata used in the reproducing processing of the morphing intermediate image generation processing, corresponding metadata are used for respective intermediate low progression level polygon models.

19. A computer-readable recording medium storing a processing program realizing a morphing image processing system using polygon reduction processing, the processing program comprising:

a low progression level polygon model generation processing operation for performing polygon reduction processing to a first polygon model corresponding to the first image and a second polygon model corresponding to the second image to generate a first low progression level polygon model and a second low progression level polygon model having a reduced number of polygon vertices, wherein the polygon reduction processing is for obtaining polygon vertex data on each progression level and metadata, and a polygon vertex reduction process is recorded in the metadata;

a low progression level polygon model morphing processing operation for forming intermediate low progression level polygon models interpolated between the vertices of the first low progression level polygon model and the vertices of the second low progression level polygon model; and a morphing intermediate image generation processing operation for performing reproducing processing to generate intermediate images between the first and second images by using the metadata, based on the respective intermediate low progression level polygon models, wherein the reproducing processing follows procedures in the opposite order of the polygon vertex reduction process.

* * * * *

UNITED STATES PATENT AND TRADEMARK OFFICE
CERTIFICATE OF CORRECTION

PATENT NO. : 6,597,368 B1 Page 1 of 1
DATED : July 22, 2003
INVENTOR(S) : Arai et al.

It is certified that error appears in the above-identified patent and that said Letters Patent is hereby corrected as shown below:

Title page,
Item [*] Notice, "Subject to any disclaimer, the term of this patent is extended or adjusted under 35 U.S.C. 154(b) by 483 days." should read -- [*] Notice: Subject to any disclaimer, the term of this patent is extended or adjusted under 35 U.S.C. 154 (b) by 540 days --

Signed and Sealed this

Eleventh Day of May, 2004

JON W. DUDAS
*Acting Director of the United States Patent and Trademark Office*